US010531504B2

(12) United States Patent
Muraoka et al.

(10) Patent No.: US 10,531,504 B2
(45) Date of Patent: Jan. 7, 2020

(54) BASE STATION AND SCHEDULING METHOD

(71) Applicant: NEC Corporation, Tokyo (JP)

(72) Inventors: Kazushi Muraoka, Tokyo (JP); Hiroto Sugahara, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 28 days.

(21) Appl. No.: 15/578,271

(22) PCT Filed: Mar. 31, 2016

(86) PCT No.: PCT/JP2016/001863
§ 371 (c)(1),
(2) Date: Nov. 30, 2017

(87) PCT Pub. No.: WO2016/194279
PCT Pub. Date: Dec. 8, 2016

(65) Prior Publication Data
US 2018/0146500 A1 May 24, 2018

(30) Foreign Application Priority Data

Jun. 2, 2015 (JP) .................... 2015-112698

(51) Int. Cl.
H04W 76/14 (2018.01)
H04W 24/02 (2009.01)
(Continued)

(52) U.S. Cl.
CPC ........... H04W 76/14 (2018.02); H04W 24/02 (2013.01); H04W 72/0406 (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2012/0322484 A1* 12/2012 Yu ................ H04W 4/08
455/509
2015/0208262 A1* 7/2015 Siomina ........... H04W 64/00
370/252
(Continued)

FOREIGN PATENT DOCUMENTS

JP 2014-230131 A 12/2014
JP 2015-019179 A 1/2015
(Continued)

OTHER PUBLICATIONS

Klaus Doppler et al., "Mode selection for Device-to-Device Communication underlaying an LTE-Advanced Network," in Proceedings of IEEE Wireless Communications and Networking Conference (WCNC), Apr. 2010, 6 pages.
(Continued)

Primary Examiner — Hassan A Phillips
Assistant Examiner — Prenell P Jones
(74) Attorney, Agent, or Firm — Sughrue Mion, PLLC

(57) ABSTRACT

A base station (2) is configured to schedule radio resources to device-to-device (D2D) transmissions (101A, 101B and 101C) performed by D2D communication pairs (3A, 3B and 3C) in accordance with an allocation rule that permits two D2D communication pairs (3A and 3C) that are not in proximity to each other to share an identical radio resource but prohibits two D2D communication pairs (3A and 3B) in proximity to each other from sharing an identical radio resource. Each D2D transmission (101) includes wirelessly transmitting from one radio terminal (1) directly to the other radio terminal (1) in each D2D communication pair (3) without passing through the base station (2). It is, thus, possible to enable efficient spatial reuse of radio resources in D2D transmissions performed by D2D communication pairs.

20 Claims, 16 Drawing Sheets

(51) Int. Cl.
*H04W 72/04* (2009.01)
*H04W 72/08* (2009.01)
*H04W 92/18* (2009.01)
*H04W 8/00* (2009.01)

(52) U.S. Cl.
CPC .......... *H04W 72/082* (2013.01); *H04W 8/005* (2013.01); *H04W 92/18* (2013.01)

(56) References Cited

U.S. PATENT DOCUMENTS

| | | | |
|---|---|---|---|
| 2015/0264588 A1* | 9/2015 | Li | H04W 56/0015 370/350 |
| 2015/0304003 A1 | 10/2015 | Fujishiro et al. | |
| 2016/0142898 A1* | 5/2016 | Poitau | H04W 76/14 370/329 |
| 2016/0381690 A1* | 12/2016 | Kim | H04W 72/08 370/329 |
| 2017/0026939 A1* | 1/2017 | Fodor | H04L 5/0073 |
| 2017/0150330 A1* | 5/2017 | Kim | H04W 4/90 |
| 2017/0188381 A1* | 6/2017 | Lopes Batista | H04W 8/005 |

FOREIGN PATENT DOCUMENTS

| | | |
|---|---|---|
| WO | 2013/170908 A1 | 11/2013 |
| WO | 2014/073538 A1 | 5/2014 |

OTHER PUBLICATIONS

International Search Report of PCT/JP2016/001863 dated Jun. 21, 2016.
3GPP TS 23.303, V.12.4.0 (Mar. 2015), Technical Specification, 3rd Generation Partnership Project; Technical Specification Group Services and System Aspects; Proximity-based services (ProSe); Stage 2 (Release 12), Mar. 2015, pp. 1-63.
3GPP TS 36.213, V.12.5.0 (Mar. 2015), Technical Specification, 3rd Generation Partnership Project; Technical Specification Group Radio Access Network; Evolved Universal Terrestrial Radio Access (E-UTRA); Physical layer procedures (Release 12), Mar. 2015, pp. 1-239.
3GPP TS 36.300, V.12.5.0 (Mar. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Mar. 2015, pp. 1-251.

* cited by examiner

| | TIME DOMAIN RESOURCE (E.G. SUBFRAME) | | | | | | | |
|---|---|---|---|---|---|---|---|---|
| | #1 | #2 | #3 | #4 | #5 | #6 | #7 | #8 |
| PAIR #1 | ✓₁ | | ✓₃ | ✓₂ | | ✓₄ | ✓₅ | |
| PAIR #2 | | ✓₁ | | | ✓₁ | | | ✓₁ |
| PAIR #3 | ✓₂ | | | ✓₁ | | | ✓₁ | |
| PAIR #4 | | | ✓₁ | | | ✓₁ | | |
| PAIR #5 | ✓₅ | | | ✓₃ | | | ✓₄ | |

Fig. 6

|  | ALLOCATION ROUND | | | | |
|---|---|---|---|---|---|
|  | #1 | #2 | #3 | #4 | #5 |
| PAIR #1 | SUBFRAME #1 | SUBFRAME #3 | SUBFRAME #5 | SUBFRAME #6 | SUBFRAME #8 |
| PAIR #2 | SUBFRAME #2 | SUBFRAME #4 | SUBFRAME #7 | — | — |
| PAIR #3 | SUBFRAME #1 | SUBFRAME #5 | SUBFRAME #8 | — | — |
| PAIR #4 | SUBFRAME #3 | SUBFRAME #6 | — | — | — |
| PAIR #5 | SUBFRAME #1 | SUBFRAME #5 | SUBFRAME #8 | — | — |

Fig. 8

|  | TIME DOMAIN RESOURCE (E.G. SUBFRAME) | | | | | | | |
|---|---|---|---|---|---|---|---|---|
|  | #1 | #2 | #3 | #4 | #5 | #6 | #7 | #8 |
| PAIR #1 |  | ✓$_1$ | ✓$_{10}$ |  | ✓$_4$ |  |  | ✓$_7$ |
| PAIR #2 | ✓$_2$ |  |  | ✓$_5$ |  | ✓$_{11}$ | ✓$_8$ |  |
| PAIR #3 | ✓$_3$ | ✓$_{13}$ | ✓$_{12}$ | ✓$_6$ | ✓$_{14}$ | ✓$_{15}$ | ✓$_9$ | ✓$_{16}$ |

PRIORITY RESOURCES FOR CELL #A: SUBFRAMES #2, #5 AND #8

PRIORITY RESOURCES FOR CELL #B: SUBFRAMES #1, #4 AND #7

NON-PRIORITY RESOURCES: SUBFRAMES #3 AND #6

Fig. 13

BASE STATION AND SCHEDULING METHOD

CROSS REFERENCE TO RELATED APPLICATIONS

This application is a National Stage of International Application No. PCT/JP2016/001863 filed Mar. 31, 2016, claiming priority based on Japanese Patent Application No. 2015-112698 filed Jun. 2, 2015, the contents of all of which are incorporated herein by reference in their entirety.

TECHNICAL FIELD

The present disclosure relates to inter-terminal direct communication (i.e., device-to-device (D2D) communication) and, in particular, to scheduling of radio resources for D2D communication.

BACKGROUND ART

A form of communication in which a radio terminal directly communicates with another radio terminal without communicating through an infrastructure network such as a base station is called device-to-device (D2D) communication. The D2D communication includes at least one of Direct Communication and Direct Discovery. In some implementations, a plurality of radio terminals supporting D2D communication form a D2D communication group autonomously or under the control of a network, and perform communication with another radio terminal in the formed D2D communication group.

Proximity-based services (ProSe) specified in the 3GPP Release 12 are examples of the D2D communication (see, for example, Non-patent Literature 1). ProSe direct discovery is performed through a procedure in which a radio terminal capable of performing ProSe (i.e., ProSe-enabled User Equipment (UE)) detects another ProSe-enabled UE by using only the capability of a radio communication technology (e.g., Evolved Universal Terrestrial Radio Access (E-UTRA) technology) possessed by these two UEs. ProSe direct discovery may be performed by three or more ProSe-enabled UEs.

ProSe direct communication enables establishment of a communication path between two or more ProSe-enabled UEs existing in a direct communication range after the ProSe discovery procedure is performed. In other words, ProSe direct communication enables a ProSe-enabled UE to directly communicate with another ProSe-enabled UE, without communicating through a Public Land Mobile Network (PLMN) including a base station (eNodeB). ProSe direct communication may be performed by using a radio communication technology that is also used to access a base station (eNodeB) (i.e., E-UTRA technology) or by using a Wireless Local Area Network (WLAN) radio technology (i.e., IEEE 802.11 radio technology).

In the 3GPP Release 12, a radio link between radio terminals used for direct communication or direct discovery is called a Sidelink (see, for example, Section 14 of Non-patent Literature 2). Sidelink transmission uses the Long Term Evolution (LTE) frame structure defined for an uplink and a downlink and uses a subset of uplink resources in frequency and time domains. A radio terminal (i.e., UE) performs sidelink transmission by using Single Carrier FDMA (Frequency Division Multiple Access) (SC-FDMA) similar to that for the uplink.

In 3GPP Release 12 ProSe, allocation of a radio resource for sidelink transmission to a UE is performed by a radio access network (e.g., Evolved Universal Terrestrial Radio Access Network (E-UTRAN)) (see, for example, Sections 23.10 and 23.11 of Non-patent Literature 3). A UE that has been permitted to perform sidelink transmission by a ProSe function performs ProSe direct discovery or ProSe direct communication by using a radio resource allocated by a radio access network node (e.g., eNodeB). Sections 23.10 and 23.11 of Non-patent Literature 3 describe details of allocation of a radio resource for sidelink communication to a UE.

Regarding ProSe direct communication, two resource allocation modes, i.e., scheduled resource allocation and autonomous resource selection are specified. In the scheduled resource allocation for ProSe direct communication, when a UE desires to perform sidelink transmission, the UE requests an eNodeB to allocate a radio resource for sidelink transmission and the eNodeB allocates resources for sidelink control and data to the UE. Specifically, the UE transmits to the eNodeB a scheduling request to request an uplink (UL) data transmission resource (i.e., Uplink Shared Channel (UL-SCH) resource) and then transmits a Sidelink Buffer Status Report (Sidelink BSR) to the eNodeB by using a UL data transmission resource allocated by an uplink grant (UL grant). The eNodeB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) includes contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel for data transmission on a sidelink (i.e., Physical Sidelink Shared Channel (PSSCH)). The Time resource pattern index is used to determine time resources, i.e., a set of subframes, for transmitting the PSSCH. Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain. That is, the Resource block assignment and hopping allocation and the Time resource pattern index designate a resource block for transmitting the PSSCH. The UE (i.e., a sidelink transmitting terminal) determines a PSCCH resource and a PSSCH resource according to the SL grant.

Meanwhile, in the autonomous resource selection of ProSe direct communication, a UE autonomously selects resources for sidelink control (i.e., PSCCH) and data (i.e., PSSCH) from a resource pool(s) set by an eNodeB. The eNodeB may allocate a resource pool(s) for the autonomous resource selection to the UE in a System Information Block (SIB) 18. The eNodeB may allocate a resource pool for the autonomous resource selection to the UE in Radio Resource Control (RRC)_CONNECTED via dedicated RRC signaling. This resource pool may be available when the UE is in RRC_IDLE.

Regarding ProSe direct discovery, two resource allocation modes, i.e., scheduled resource allocation and autonomous resource selection are also specified. In the autonomous resource selection for ProSe direct discovery, a UE that desires transmission (announcement) of a discovery signal (discovery information) autonomously selects radio resources from a resource pool(s) for announcement. This resource pool is configured in UEs via broadcast (SIB 19) or dedicated signaling (RRC signaling).

Meanwhile, in the scheduled resource allocation for ProSe direct discovery, a UE requests an eNodeB to allocate resources for announcement via RRC signaling. The eNodeB allocates resources for announcement from a resource pool that is configured in UEs for monitoring. When the scheduled resource allocation is used, the eNodeB indicates in SIB 19 that it provides resources for monitoring of ProSe direct discovery but does not provide resources for announcement.

When direct transmission is performed on a sidelink, a UE on a transmitting side (i.e., a D2D transmitting UE) (hereinafter referred to as a transmitting terminal) transmits Scheduling Assignment information by using a portion of radio resources (i.e., resource pool) for a sidelink control channel (i.e., PSCCH). The scheduling assignment information is also referred to as Sidelink Control Information (SCI) format 0. The scheduling assignment information includes contents such as resource block assignment and hopping allocation, a time resource pattern index, and a Modulation and Coding Scheme (MCS). In the case of the above-described scheduled resource allocation, the Resource block assignment and hopping allocation and the time resource pattern index indicated by the Scheduling Assignment (i.e., SCI format 0) follow the Resource block assignment and hopping allocation and the time resource pattern index indicated by the SL grant (i.e., DCI format 5) received from the eNodeB.

The transmitting terminal transmits data on the PSSCH by using a radio resource according to the scheduling assignment information. A UE on a receiving side (i.e., a D2D receiving UE) (hereinafter referred to as a receiving terminal) receives the scheduling assignment information from the transmitting terminal on the PSCCH and receives the data on the PSSCH according to the received scheduling assignment information. Note that the term "transmitting terminal" just focuses on a transmission operation of a radio terminal and does not mean a radio terminal used for transmission only. Similarly, the term "receiving terminal" is an expression for expressing a receiving operation of a radio terminal and does not mean a radio terminal used for reception only. That is, the transmitting terminal is able to perform a receiving operation and the receiving terminal is able to perform a transmitting operation.

CITATION LIST

Patent Literature

Patent Literature 1: Japanese Unexamined Patent Application Publication No. 2015-019179

Non Patent Literature

Non-patent Literature 1: 3GPP TS 23.303 V12.4.0 (2015-03), "3rd Generation Partnership Project; Technical Specification Group Services and System Aspects; Proximity-based services (ProSe); Stage 2 (Release 12)", March 2015
Non-patent Literature 2: 3GPP TS 36.213 V12.5.0 (2015-03), "3rd Generation Partnership Project; Technical Specification Group Radio Access Network; Evolved Universal Terrestrial Radio Access (E-UTRA); Physical layer procedures (Release 12)", March 2015
Non-patent Literature 3: 3GPP TS 36.300 V12.5.0 (2015-03), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", March 2015
Non-patent Literature 4: K. Doppler, C. Yu, C. Ribeiro, and P. Janis, "Mode Selection for Device-to-Device Communication underlaying an LTE-Advanced Network," in Proceedings of IEEE Wireless Communications and Networking Conference (WCNC), April 2010

SUMMARY OF INVENTION

Technical Problem

A plurality of D2D transmissions simultaneously use the same radio resource, which contributes to improvement in the efficiency of use of radio resources. The radio resource is, for example, a time resource, a frequency resource, a time-frequency resource, an orthogonal code resource, a transmission power resource, or any combination thereof. In the case of 3GPP Release 12 ProSe, the radio resource is a time-frequency resource and its minimum unit is the above-described resource block. However, when D2D communication pairs located in proximity to each other use the same radio resource at the same time, it could cause interference among these D2D transmissions. Note that the term "D2D communication pair" in this specification means a pair of a D2D transmitting terminal and a D2D receiving terminal that perform D2D transmission.

Non-patent Literature 4 discloses that a base station selects a mode of D2D communication performed in a cellular network. Specifically, the base station takes into account interference (i.e., signal-to-interference plus noise ratio (SINR)) between a cellular user (i.e., UE) who performs cellular communication and a D2D communication pair and determines whether the D2D communication pair should reuse the whole resources for cellular communication (i.e., resources used for communication between the base station and other radio terminals) (i.e., a reuse mode), should use some of the resources for the cellular communication as a dedicated resource (i.e., a dedicated mode), or should communicate through the base station (i.e., a cellular mode).

Patent Literature 1 discloses that a base station allocates a dedicated radio resource for direct discovery to two radio terminals. In an example, the base station disclosed in Patent Literature 1 detects an occurrence of interference between a D2D communication pair and a cellular user (i.e., UE) and then allocates a dedicated radio resource for direct discovery to the cellular user and a radio terminal of the D2D communication pair. In this way, the radio terminal of the D2D communication pair and the cellular user can perform a direct discovery procedure using the dedicated radio resource, and accordingly can start D2D communication after the completion of the direct discovery.

However, Non-patent Literature 3 and Patent Literature 1 merely disclose that interference between a D2D communication pair and a cellular user (UE) is considered. In other words, nothing in Non-patent Literature 3 and Patent Literature 1 fail to disclose allocation of radio resources to a plurality of D2D transmissions performed by a plurality of D2D communication pairs, and accordingly fail to disclose interference among a plurality of D2D transmissions and spatial reuse of radio resources in the plurality of D2D transmissions.

One of the objects to be attained by embodiments disclosed in this specification is to provide an apparatus, a method, and a program that contribute to enabling efficient spatial reuse of radio resources in a plurality of D2D transmissions performed by a plurality of D2D communication pairs.

Solution to Problem

In a first aspect, a base station includes a radio transceiver and at least one processor. The radio transceiver is configured to communicate with a plurality of radio terminals located in a first cell. The at least one processor is configured to schedule radio resources to a plurality of device-to-device (D2D) transmissions performed by a plurality of D2D communication pairs included in the plurality of radio terminals. Each D2D transmission includes wirelessly transmitting from one radio terminal directly to the other radio terminal in each D2D communication pair without passing through the base station. The at least one processor is further configured to schedule radio resources to the plurality of D2D transmissions in accordance with an allocation rule that permits two D2D communication pairs that are not in proximity to each other to share an identical radio resource but prohibits two D2D communication pairs in proximity to each other from sharing an identical radio resource.

In a second aspect, a scheduling method, performed in a base station, includes scheduling radio resources to a plurality of device-to-device (D2D) transmissions performed by a plurality of D2D communication pairs, in accordance with an allocation rule that permits two D2D communication pairs that are not in proximity to each other to share an identical radio resource but prohibits two D2D communication pairs in proximity to each other from sharing an identical radio resource. Each D2D transmission includes wirelessly transmitting from one radio terminal directly to the other radio terminal in each D2D communication pair without passing through the base station.

In a third aspect, a program includes a set of instructions (software codes) that, when loaded into a computer, causes the computer to perform a method according to the above-described second aspect.

Advantageous Effects of Invention

According to the above-described aspects, it is possible to provide an apparatus, a method, and a program that contribute to enabling efficient spatial reuse of radio resources in a plurality of D2D transmissions performed by a plurality of D2D communication pairs.

BRIEF DESCRIPTION OF DRAWINGS

FIG. 6 shows an example of allocation of radio resources to a plurality of D2D communication pairs;

FIG. 8 shows an example of allocation of radio resources to a plurality of D2D communication pairs;

FIG. 13 shows an example of allocation of radio resources to a plurality of D2D communication pairs;

DESCRIPTION OF EMBODIMENTS

Specific embodiments are explained hereinafter in detail with reference to the drawings. The same or corresponding elements are denoted by the same symbols throughout the drawings, and duplicated explanations are omitted as necessary for the sake of clarity.

First Embodiment

Figure 1:
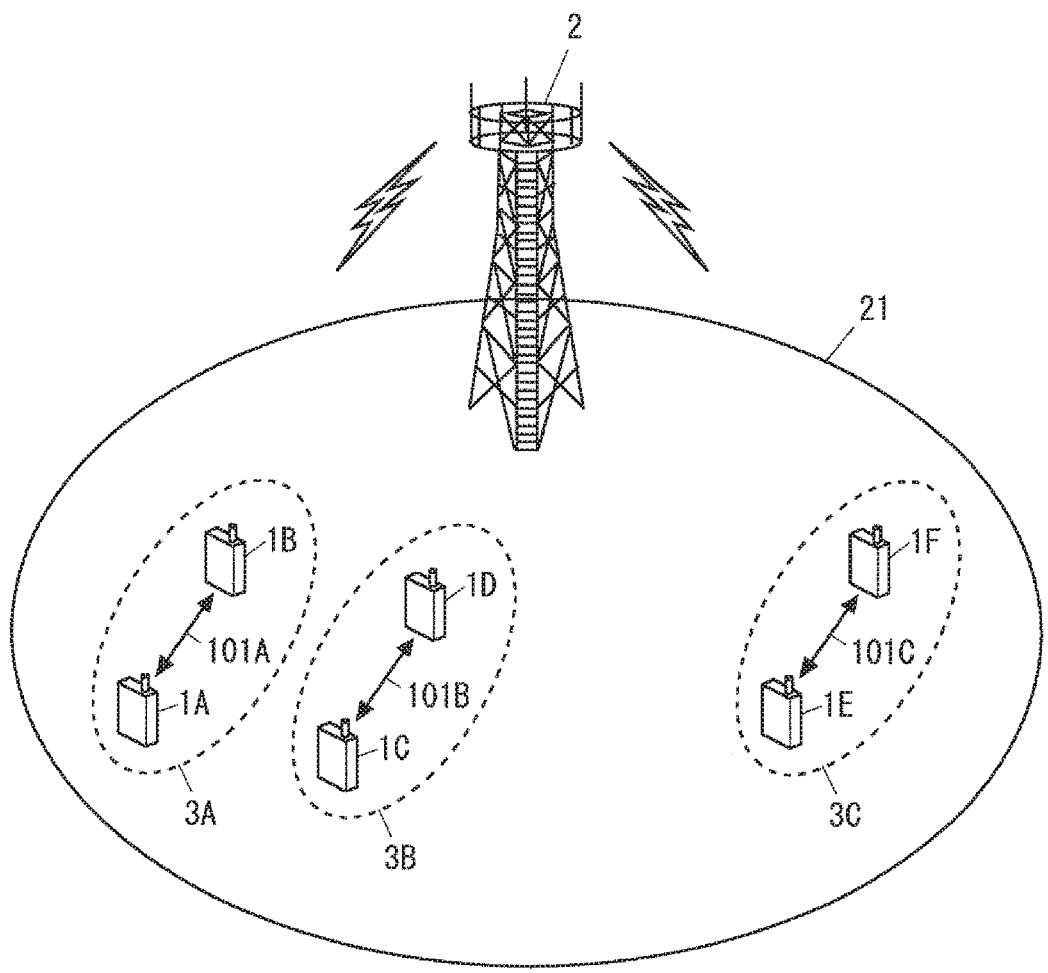
FIG. 1 shows a configuration example of a radio communication system according to a first embodiment.

FIG. 1 shows a configuration example of a radio communication system according to this embodiment. A radio terminal 1 is able to perform D2D communication (e.g., ProSe) and can perform D2D communication on an inter-terminal direct interface (i.e., sidelink) 101. As already explained above, the D2D communication includes at least one of direct discovery and direct communication. The D2D communication can also be referred to as sidelink communication or ProSe communication. The example of FIG. 1 shows six radio terminals 1A to 1F and three sidelink communication pairs 3A to 3C. The D2D communication pair 3A includes the radio terminals 1A and 1B and performs D2D communication on a sidelink 101A. The D2D communication pair 3B includes the radio terminals 1C and 1D and performs D2D communication on a sidelink 101B. The D2D communication pair 3C includes the radio terminals 1E and 1F and performs D2D communication on a sidelink 101C.

A base station 2 manages a cell 21 and can communicate with each radio terminal 1 by using a cellular communication technology (e.g., Evolved Universal Terrestrial Radio Access (E-UTRA) technology). In this embodiment, scheduled resource allocation is used to allocate a radio resource to D2D transmission. That is, the base station 2 is configured to communicate with one of the radio terminals 1 (i.e., transmitting terminal) of each D2D communication pair 3 that performs D2D transmission within the coverage of the cell 21 and configured to schedule (or allocate) a radio resource for the D2D transmission to this radio terminal. Further, in order to prevent interference among a plurality of D2D transmissions performed by a plurality of D2D communication pairs 3 in proximity to each other, the base station 2 is configured to allocate radio resources to respective D2D transmissions performed by these D2D communication pairs 3 (or to respective transmitting terminals) while considering proximity relationships (or neighbor relationships) among these D2D communication pairs 3.

Figure 2:
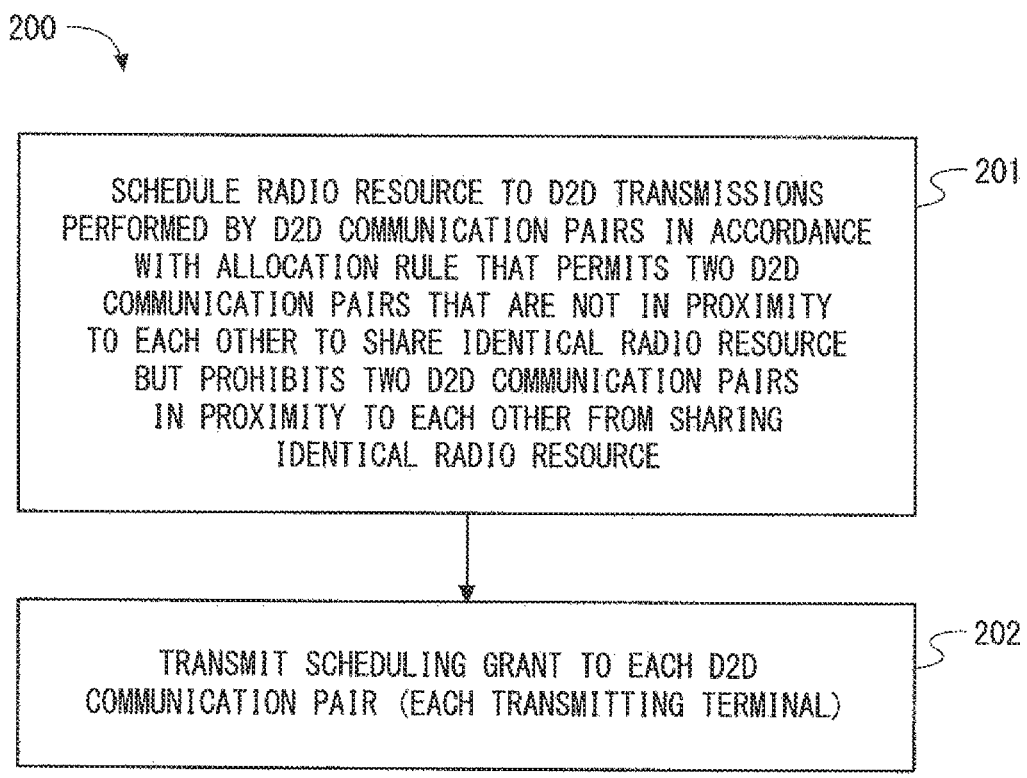
FIG. 2 is a flowchart showing an example of an operation performed by a base station according to the first embodiment.

FIG. 2 is a flowchart showing an example (a process 200) of a scheduling method performed by the base station 2. In block 201, the base station 2 schedules radio resources to a plurality of D2D transmissions performed by a plurality of D2D communication pairs 3 in accordance with a predetermined allocation rule. The predetermined allocation rule permits two D2D communication pairs 3 that are not in proximity to each other to share an identical radio resource, but it prohibits two D2D communication pairs 3 in proximity to each other from sharing an identical radio resource. In block 201, the base station 2 transmits, to each D2D communication pair 3 (i.e., transmitting terminal of each D2D communication pair 3), a grant for sidelink transmission on a radio resource determined in block 201 (e.g., a scheduling grant or a sidelink grant).

In an example, a proximity relationship between two D2D communication pairs may be evaluated based on whether the two transmitting terminals of these two pairs are in proximity to each other. Alternatively, a proximity relationship between two D2D communication pairs may be evaluated based on whether the transmitting terminal of one of the pairs and the receiving terminal of the other pair are in proximity to each other.

The base station 2 may be configured to determine whether two D2D communication pairs 3 are in proximity to each other. In some implementations, the base station 2 may use a result of detecting neighboring radio terminals reported from at least one radio terminal 1 belonging to at least one of two D2D communication pairs 3 in order to determine whether the two D2D communication pairs 3 are in proximity to each other.

The result of detecting neighboring radio terminals may indicate one or more transmission terminals that each transmitted a discovery signal for direct discovery that has been received by the radio terminal 1. The result of detecting neighboring radio terminals may include, for example, at least one of: (a) an identifier of each of one or more neighboring radio terminals; and (b) an identifier of each of one or more D2D communication pairs to which the one or more neighboring radio terminals belong. The result of detecting neighboring radio terminals may further include at least one of: (c) an identifier of a base station or a cell with which each of the one or more neighboring radio terminals is associated; (d) received signal power of a signal (e.g., discovery signal) transmitted from each of the one or more neighboring radio terminals; and (e) the number of times of detection of the one or more neighboring radio terminals. Note that to enable the radio terminal 1 to report the above-described detection result to the base station 2, the discovery signal transmitted by each neighboring radio terminal may include, as its message, (a) an identifier of the neighboring radio terminal itself and (b) an identifier of one or more D2D communication pairs to which the neighboring radio terminal itself belongs, and it may also include (c) an identifier of a base station or a cell with which the neighboring radio terminal itself is associated.

The radio terminal 1 may report the result of detection of neighboring radio terminals to the base station 2 periodically or aperiodically. For example, the radio terminal 1 may transmit the result of detection of neighboring radio terminals to the base station 2 when a list of neighboring radio terminals changes. The period (a time window) in which the list of neighboring radio terminals is generated may be a scheduling period that is in inverse proportion to a discovery transmission probability (100%, 75%, 50% or 25%) which is broadcasted on system information from the base station 2.

In an example, the base station 2 may determine that a D2D communication pair to which the radio terminal 1 belongs and a D2D communication pair to which a neighboring radio terminal detected by the radio terminal 1 belongs are in proximity to each other (i.e., they are in a proximity relationship). In another example, the base station 2 may evaluate a proximity level between two D2D communication pairs in multiple levels no less than three levels. In such a case, the base station 2 may determine the proximity level between the two D2D communication pairs based on received signal power of a signal (e.g., discovery signal) transmitted from the neighboring radio terminal measured by the radio terminal 1.

Alternatively, in some implementations, the base station 2 may use location information of at least one radio terminal 1 of each D2D communication pair 3 in order to determine whether two D2D communication pairs 3 are in proximity to each other. The location information of a radio terminal 1 explicitly or implicitly indicates a geographic location of the radio terminal 1. The location information of the radio terminal 1 may include Global Navigation Satellite System (GNSS) location information obtained by a GNSS receiver. The GNSS location information indicates latitude and longitude. Additionally or alternatively, the location information of the radio terminal 1 may include Radio Frequency (RF) fingerprints. The RF fingerprints include information about adjacent cell measurement (e.g., cell ID and Reference Signal Received Power (RSRP)) measured by the radio terminal 1.

The base station 2 may receive directly from the radio terminals 1 their location information or may receive the location information through a server. For example, the base station 2 may use the location information of the radio terminals 1 that is acquired by using a network-level discovery procedure. The network-level discovery procedure is, for example, EPC-level ProSe Discovery. In EPC-level ProSe Discovery, UEs intermittently transmit to a network their location information by which the position of these UEs can be estimated and the network (i.e., ProSe function entity) determines proximity between the UEs based on the location information received from them. Alternatively, the base station 2 may use location information included in Logged Minimization of Drive Tests (MDT) measurement data obtained by the MDT function of the radio terminals 1.

In an example, when a geographic distance between two radio terminals 1 derived from their location information is shorter than a predetermined threshold, the base station 2 may determine that two D2D communication pairs 3 to which these two radio terminals 1 respectively belong are in proximity to each other (i.e., the pairs are in a proximity relationship). In another example, the base station 2 may evaluate a proximity level between two D2D communication pairs in multiple levels no less than three levels. In such a case, the base station 2 may determine a proximity level between two D2D communication pairs based on a geographic distance between two radio terminals 1 derived from their location information.

As understood from the above explanation, when the base station 2 according to this embodiment schedules radio resources to a plurality of D2D transmissions performed by a plurality of D2D communication pairs 3, the base station 2 permits two D2D communication pairs 3 that are not in proximity to each other to share an identical radio resource, but it prohibits two D2D communication pairs 3 in proximity to each other from sharing an identical radio resource. In other words, the base station 2 determines whether to perform spatial reuse of radio resources for D2D transmissions while considering locations of a plurality of D2D communication pairs (or proximity relationships among the D2D communication pairs). In this way, while permitting spatial reuse of radio resources by some D2D communication pairs, the base station 2 can prohibit sharing of an identical radio resource by other D2D communication pairs that are in proximity to each other. Therefore, the base station 2 enables efficient spatial reuse of radio resources in a plurality of D2D transmissions performed by a plurality of D2D communication pairs.

The following provides several examples regarding a scheduling algorithm modified to have a constraint in regard to proximity relationships among D2D communication pairs. In a first example, the base station 2 allocates radio resources to a plurality of D2D transmissions performed by a plurality of D2D communication pairs (or a plurality of transmitting terminals in the plurality of pairs) in accordance with a proportional fairness (PF)-based algorithm on which a constraint in regard to proximity relationships among the D2D communication pairs (i.e., the above-described allocation rule) is imposed.

In the PF-based scheduling, a scheduling metric (i.e., PF metric) of D2D transmission (or D2D communication pair 3) in each radio resource may be a ratio of instantaneous throughput to average throughput (i.e., instantaneous throughput/average throughput). The base station 2 may adaptively determine a modulation scheme and a coding rate (MCS) according to the reception level of a discovery signal (or another signal for measuring channel quality) and calculate instantaneous throughput of D2D transmission (or a D2D communication pair 3 or a transmitting terminal) by using the determined modulation scheme and coding rate. Alternatively, the base station 2 may use a fixed value of the instantaneous throughput without considering the adaptive MCS. Using a fixed value of the instantaneous throughput, the PF metric is a reciprocal of the average throughput and, therefore, the base station 2 allocates radio resources to D2D transmissions (or D2D communication pairs 3 or transmitting terminals) in an ascending order of their average throughput.

However, since the constraint in regard to proximity relationships among D2D communication pairs (i.e., the above-described allocation rule) is imposed, the base station 2 operates as follows. Specifically, although the base station 2 selects a D2D communication pair 3 (or D2D transmission or transmitting terminal) based on a PF metric on the radio resource of interest, the base station 2 does not allocate the radio resource to the D2D transmission performed by the selected D2D communication pair (or transmitting terminal) when another D2D communication pair (or D2D transmission or transmitting terminal) that is in a proximity relation with the selected D2D communication pair 3 has already been scheduled in the radio resource. In other words, the base station 2 selects a first D2D communication pair (or D2D transmission or transmitting terminal) in the descending order of the scheduling metric on a first radio resource of interest, and if the first radio resource has not been allocated to a second D2D communication pair (or D2D transmission or transmitting terminal) that has a larger scheduling metric than the first D2D communication pair and is in a proximity relationship with the first D2D communication pair, the base station 2 allocates the first radio resource to D2D transmission performed by the first D2D communication pair (or transmitting terminal).

Figure 3:
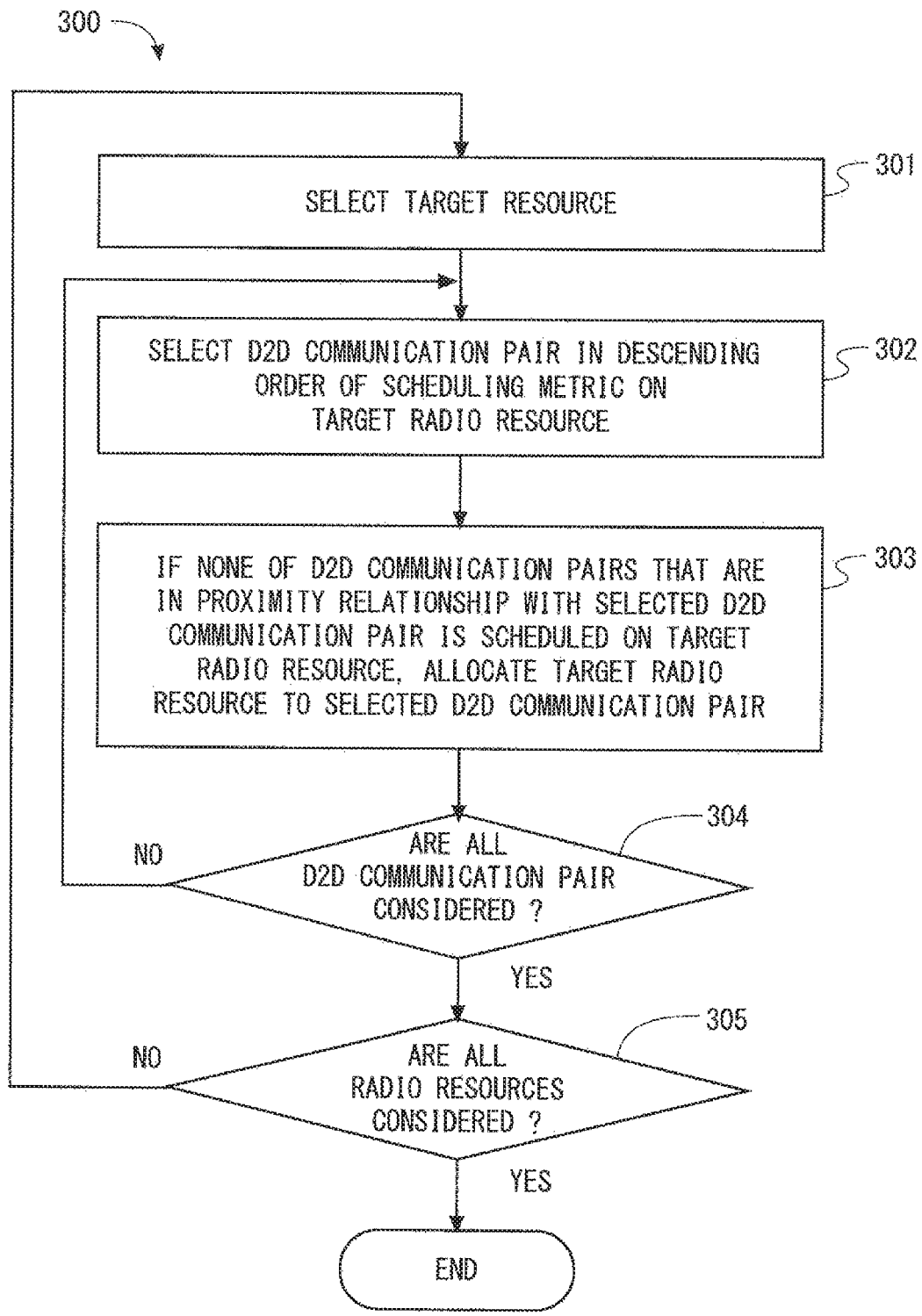
FIG. 3 is a flowchart showing an example of an operation performed by a base station according to the first embodiment.

FIG. 3 is a flowchart showing an example (a process 300) of the PF-based scheduling on which a constraint in regard to proximity relationships among D2D communication pairs is imposed. In block 301, the base station 2 selects a radio resource of interest (hereinafter referred to as a target radio resource). In block 302, the base station 2 selects a D2D communication pair in the descending order of the scheduling metric (i.e., PF metric) on the target radio resource. In block 303, if none of D2D communication pairs that are in a proximity relationship with the selected D2D communication pair is scheduled in the target radio resource, the base station 2 allocates the target radio resource to the selected D2D communication pair. The base station 2 repeats the processes in blocks 302 and 303 until all the D2D communication pairs (or transmitting terminals) that have requested allocation of radio resources are considered for the target radio resource (block 304). Further, the base station 2 repeats the processes in blocks 301 to 303 for all the radio resources that should be considered in one scheduling period (block 305). The scheduling period is a period in which the base station 2 transmits a scheduling grant for sidelink (i.e., SL grant). In the 3GPP Release 12, the scheduling period for sidelink is referred to as a Sidelink Control period or a PSCCH period.

Figure 4:
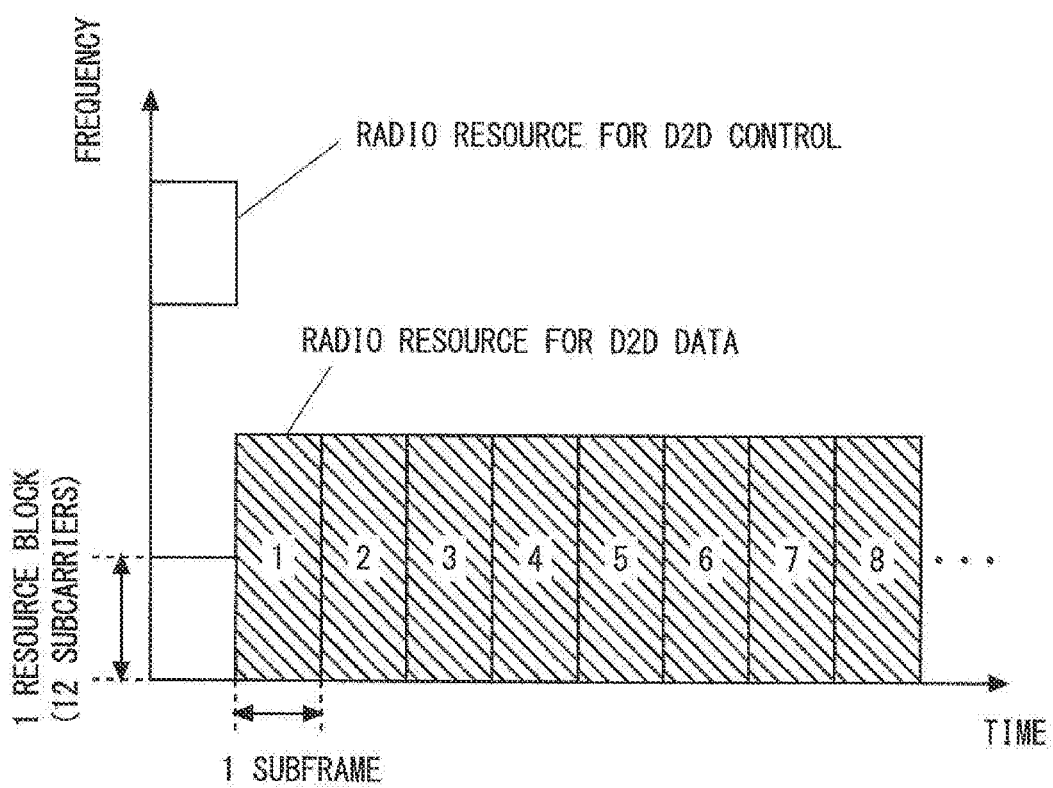
FIG. 4 shows a specific example of radio resources.

A specific example of allocation of radio resources by the PF-based scheduling in which the constraint in regard to proximity relationships among D2D communication pairs is imposed is described with reference to FIGS. 4 to 6. FIG. 4 shows an example of radio resources used for D2D transmission in the 3GPP Release 12. In the 3GPP Release 12, the scheduling period for sidelink (i.e., Sidelink Control period or PSCCH period) is set to, for example, 40 ms or longer, and meanwhile allocation of PSSCH resources for D2D data transmission is specified for every 6, 7 or 8 subframes (i.e., 6, 7 or 8 ms) by using the time resource pattern index. Accordingly, the same allocation of PSSCH resources is used for every 6, 7 or 8 subframes during one Sidelink Control period. In the case of Frequency division duplex (FDD), the period of allocation of PSSCH resources (i.e., time resource pattern) is 8 subframes. Meanwhile, in the case of TDD, the period of allocation of PSSCH resources (i.e., time resource pattern) is set to 6, 7 or 8 subframes depending on the TDD UL/DL configuration. FIG. 4 shows a case in which the allocation period of PSSCH resources (i.e., time resource pattern) for D2D data transmission is 8 subframes. Note that FIG. 4 shows just an example, and allocation of frequency domain resources may be performed instead of or in addition to the allocation of time domain resources (e.g., subframes).

Figure 5:
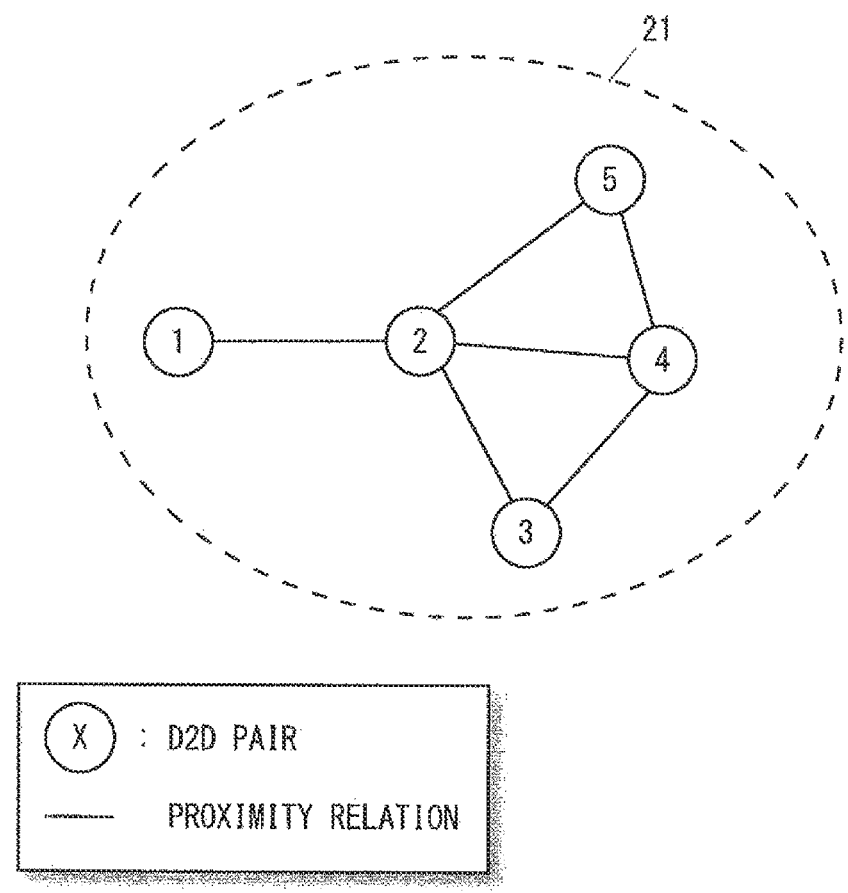
FIG. 5 shows a specific example of a proximity relationship among a plurality of D2D communication pairs.

FIG. 5 is a schematic diagram showing a specific example of proximity relationships among a plurality of D2D communication pairs 3 in the cell 21 managed by the base station 2. The example of FIG. 5 shows proximity relationships among five D2D communication pairs. Specifically, D2D communication pair #1 has a proximity relationship with D2D communication pair #2. D2D communication pair #2 has proximity relationships with all of the other four D2D communication pairs #1, #3, #4 and #5. D2D communication pair #3 has proximity relationships with two D2D communication pairs #2 and #4. D2D communication pair #4 has proximity relationships with three D2D communication pairs #2, #3 and #5. D2D communication pair #5 has proximity relationships with two D2D communication pairs #2 and #4.

FIG. 6 shows an example in which the D2D data transmission resources having an eight-subframe period shown in FIG. 4 are allocated to the five D2D communication pairs 3 shown in FIG. 5 in accordance with the scheduling algorithm shown in FIG. 3. A tick mark symbol in each cell in the table of FIG. 6 indicates that the corresponding time domain resource (i.e., subframe) is allocated to the corresponding D2D communication pair. Further, numerical subscripts of the tick mark symbols indicate the descending order of the scheduling metric (i.e., PF metric) in respective time domain resources.

For example, in subframe #1, since the PF metric of D2D communication pair #1 is the largest, D2D transmission performed by D2D communication pair #1 is scheduled in subframe #1 first. Next, since the PF metric of D2D communication pair #3 is the second largest and D2D communication pair #3 is not in a proximity relationship with D2D communication pair #1, D2D transmission performed by D2D communication pair #3 is scheduled in subframe #1 second. Although the PF metrics of D2D communication pairs #2 and #4 are the third and fourth largest, the D2D transmission performed by D2D communication pair #3, which is in a proximity relationship with these pairs, has already been scheduled in subframe #1, and thus subframe #1 is not allocated to D2D transmissions performed by D2D communication pairs #2 and #4. Lastly, since the PF metric of D2D communication pair #5 is the fifth largest (i.e., the smallest) and D2D communication pair #5 is not in a proximity relationship with D2D communication pairs #1 and #3, D2D transmission performed by D2D communication pair #5 is scheduled in subframe #1.

The scheduling metric (i.e., PF metric) may be updated for every subframe by updating the average throughput every time the subframe is allocated, or it may be updated for every scheduling period.

Further, the above-described first example of the scheduling algorithm provides the procedure in which, for each subframe, terminals to which that subframe can be allocated are searched for and when there is no terminal to which that subframe can be allocated, the process moves to allocation of the next subframe. However, other procedures can also be employed. For example, an alternative procedure may include: selecting a D2D communication pair in accordance with a descending order of their PF metrics; selecting an arbitrary subframe from among subframes for which the selected D2D communication pair meets the constraint in regard to proximity relationships; and allocating the selected subframe to the selected D2D communication pair. Further, regarding the method for selecting a subframe, one of the following methods can be used: (1) selecting a subframe in which the number of D2D communication pairs to which the subframe has already been allocated is the smallest; (2) selecting a subframe in which the maximum value of the proximity levels of D2D communication pairs (i.e., the nearest terminal) to which the subframe has already been allocated is the smallest; and (3) selecting a subframe in which the level of the total interference that is expected to occur due to D2D communication pairs to which the subframe has already been allocated is the smallest.

Next, a second example of the scheduling algorithm on modified to have a constraint in regard to proximity relationships among D2D communication pairs is described. In the second example, the base station 2 allocates radio resources to a plurality of D2D transmissions performed by a plurality of D2D communication pairs (or a plurality of transmitting terminals in the plurality of pairs) in accordance with a round-robin algorithm on which a constraint in regard to proximity relationships among D2D communication pairs (i.e., the above-described allocation rule) is imposed.

In the round-robin scheduling, the base station 2 allocates radio resources to D2D communication pairs (or transmitting terminals) that have requested allocation of radio resources for D2D transmission in a one-by-one manner. However, since the constraint in regard to proximity relationships among D2D communication pairs (i.e., the above-described allocation rule) is imposed, the base station 2 does not schedule, on the same radio resource, both of two D2D communication pairs that are in a proximity relationship with each other.

Figure 7:
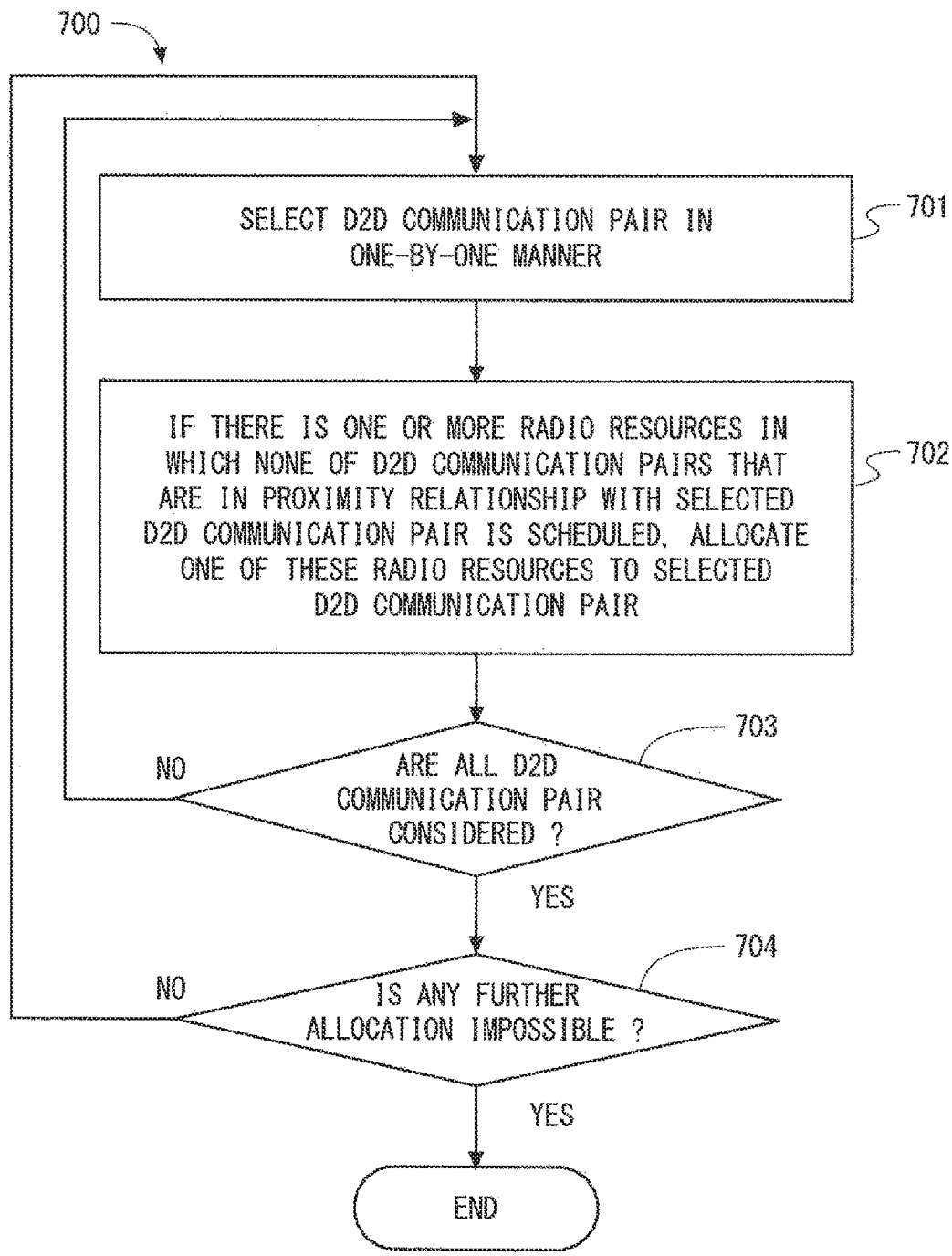
FIG. 7 is a flowchart showing an example of an operation performed by a base station according to the first embodiment.

FIG. 7 is a flowchart showing an example (a process 700) of the round-robin scheduling in which the constraint in regard to proximity relationships among D2D communication pairs is imposed. In block 701, the base station 2 selects one D2D communication pair (or transmitting terminal) from among a plurality of D2D communication pairs (or transmitting terminals) that have requested allocation of radio resources for D2D transmission in a one-by-one manner. In block 702, if there is one or more radio resources in which none of D2D communication pairs that are in a proximity relationship with the selected D2D communication pair is scheduled among all the radio resources that should be considered in one scheduling period, the base station 2 allocates one of those radio resources to the selected D2D communication pair (or transmitting terminal). The base station 2 repeats the processes in blocks 701 and 702 until all the D2D communication pairs (transmitting terminals) that have requested allocation of radio resources are considered (block 703). Further, the base station 2 repeats the processes in blocks 701 to 703 until any resource can no longer be allocated to any of the D2D communication pairs (block 704).

FIG. 8 shows an example in which the D2D data transmission resources having an eight-subframe period shown in FIG. 4 are allocated to the five D2D communication pairs 3 shown in FIG. 5 in accordance with the algorithm shown in FIG. 7. A subframe number in each cell in the table shown in FIG. 8 indicates a radio resource allocated to the corresponding D2D communication pair in the corresponding allocation round. A dash mark in each cell indicates that a radio resource cannot be allocated to D2D transmission performed by the corresponding D2D communication pair in the corresponding allocation round due to the constraint in regard to proximity relationships.

For example, in the first allocation round #1, a radio resource is allocated as described below. Firstly, D2D transmission performed by D2D communication pair #1 is scheduled in subframe #1. Next, in the allocation of a radio resource to D2D communication pair #2, since D2D communication pair #2 is in a proximity relationship with D2D communication pair #1, one of the subframes other than subframe #1, i.e., one of the seven subframes #2 to #8 is allocated to D2D communication pair #2. In the example shown in FIG. 8, D2D transmission performed by D2D communication pair #2 is scheduled in subframe #2. Next, in the allocation of a radio resource to D2D communication pair #3, since D2D communication pair #3 is in a proximity relationship with D2D communication pairs #2 and #4, one of the subframes other than subframe #2, i.e., one of the seven subframes #1 and #3 to #8 is allocated to D2D communication pair #3. In the example shown in FIG. 8, D2D transmission performed by D2D communication pair #3 is scheduled in the same subframe #1 as the D2D transmission performed by D2D communication pair #1.

Further, in the allocation of a radio resource to D2D communication pair #4 in allocation round #1, since D2D communication pair #4 is in a proximity relationship with D2D communication pairs #2, #3 and #5, one of the subframes other than subframes #1 and #2, i.e., one of the six subframes #3 to #8 is allocated to D2D communication pair #4. In the example shown in FIG. 8, D2D transmission performed by D2D communication pair #4 is scheduled in subframe #3. Lastly, in the allocation of a radio resource to D2D communication pair #5 in allocation round #1, since D2D communication pair #5 is in a proximity relationship with D2D communication pairs #2 and #4, one of the subframes other than subframes #2 and #3, i.e., one of the six subframes #1 and #4 to #8 is allocated to D2D communication pair #5. In the example shown in FIG. 8, D2D transmission performed by D2D communication pair #5 is scheduled in the same subframe #1 as the D2D transmissions performed by D2D communication pairs #1 and #3.

As understood from the specific examples shown in FIGS. 6 to 8, by using a scheduling algorithm modified to have the constraint in regard to proximity relationships among D2D communication pairs, it is possible to allocate a radio resource to each D2D transmission while preventing interference among D2D transmissions, and also to enable a D2D communication pair (or a transmitting terminal) in a good condition in which no other D2D communication pair exists in the proximity thereof to use a large number of radio resources by the effect of the spatial reuse.

Second Embodiment

Figure 9:
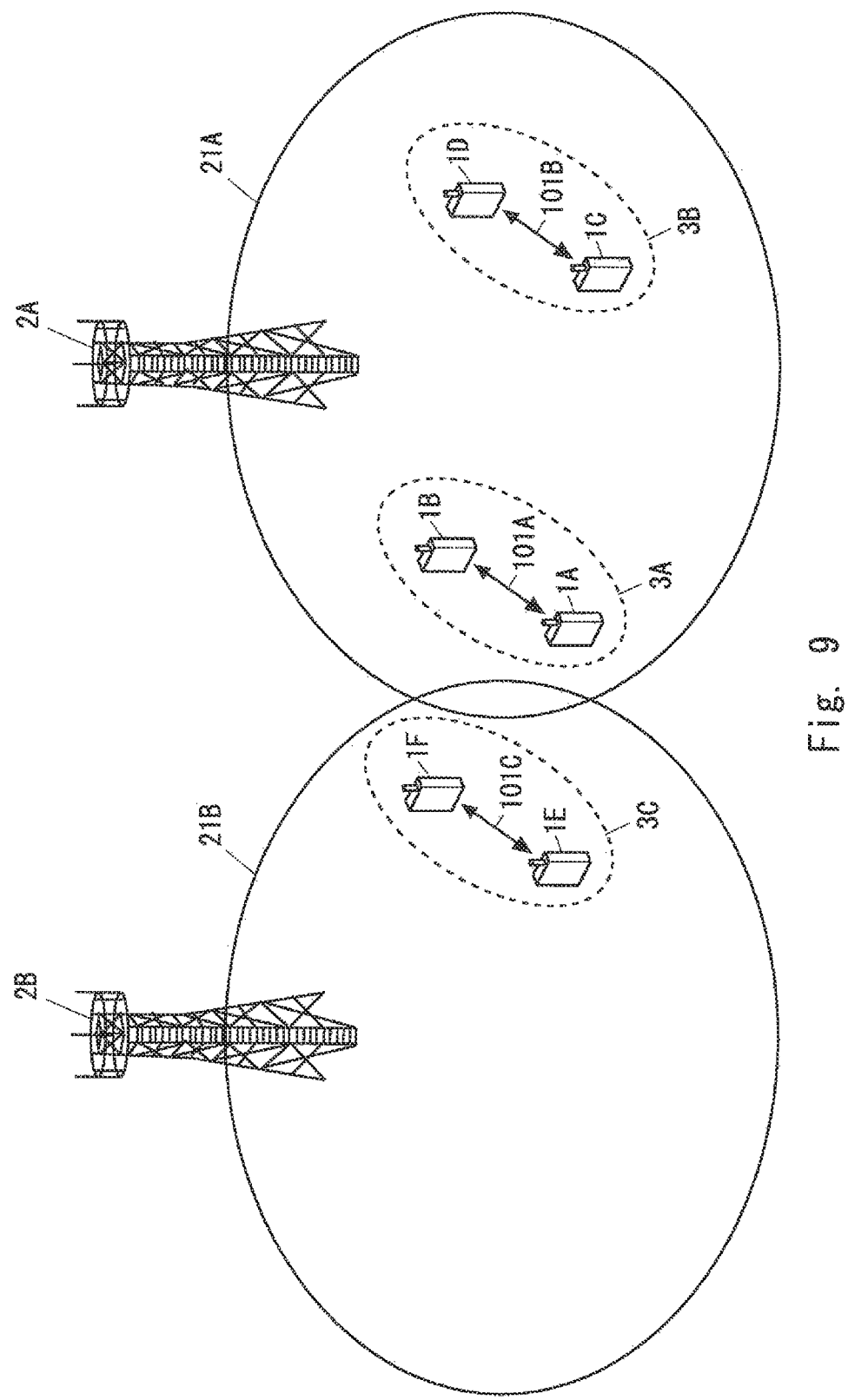
FIG. 9 shows a configuration example of a radio communication system according to a second embodiment.

This embodiment provides a modified example of the procedure for allocating radio resources to D2D transmissions explained in the first embodiment. FIG. 9 shows a configuration example of a radio communication system according to this embodiment. In this embodiment, the base station 2 is configured, when it allocates a radio resource to D2D transmission performed by a D2D communication pair 3 (or a transmitting terminal) located within coverage of the cell 21, to consider whether the D2D communication pair 3 (or the transmitting terminal) is in a proximity relationship with a radio terminal belonging to an adjacent cell.

For example, a base station 2A shown in FIG. 9 detects that a D2D communication pair 3A located in coverage of its cell 21A is in a proximity relationship with an adjacent-cell radio terminal 1E or 1F belonging to an adjacent cell 21B or with an adjacent-cell D2D communication pair 3C, and allocates a prioritized radio resource of the cell 21A, preferentially over other radio resources, to D2D transmission performed by the D2D communication pair 3A. Note that the prioritized radio resource of the cell 21A is a radio resource of which a base station 2B, which manages the adjacent cell 21B, prohibits the use by radio terminals 1 (e.g., radio terminals 1E and 1F) located in the adjacent cell 21B. Meanwhile, the base station 2A detects that a D2D communication pair 3B located in the coverage of the cell 21A is not in proximity to any adjacent-cell radio terminal or adjacent-cell D2D communication pair, and allocates a radio resource other than the prioritized radio resource of the cell 21A preferentially to D2D transmission performed by the D2D communication pair 3B. The above-described radio resource allocation operation performed by the base station 2A can contribute to preventing interference on radio resources between adjacent cells.

The radio resources other than the prioritized radio resource of the cell 21A may include a prioritized radio resource for the adjacent cell 21B and non-prioritized radio resources that are set to neither the prioritized radio resource of the cell 21A nor the prioritized radio resource of 21B. In this case, the base station 2A may allocate the prioritized radio resource of the cell 21B, preferentially over the prioritized radio resource of the cell 21A and the non-prioritized radio resources, to D2D transmission performed by the D2D communication pair 3B, which is not in proximity to any adjacent-cell radio terminal or adjacent-cell D2D communication pair. The use of the prioritized radio resource of the adjacent cell by the D2D communication pair 3B, which is not in a proximity relationship with any adjacent radio terminal (or adjacent D2D communication pair), does not cause inter-cell interference and can increase opportunities in which the D2D communication pair 3A, which is in a proximity relationship with an adjacent-cell radio terminal (or adjacent-cell D2D communication pair), uses the non-prioritized radio resources.

The example shown in FIG. 9 shows a case in which the cell 21A has one adjacent cell 21B for easier explanation. However, two or more adjacent cells may exist around the cell 21A. In such a case, a prioritized radio resource for each of the adjacent cells may be configured. In some implementations, when a radio terminal 1 (e.g., 1A) belonging to the cell 21A is in a proximity relationship with one or more radio terminals belonging to one or more adjacent cells, the base station 2A may decreases the allocation priority of the prioritized radio resources of these one or more adjacent cells to the radio terminal 1 (e.g., 1A) so that the prioritized radio resources of the one or plurality of adjacent cells are not allocated to the radio terminal 1 (e.g., 1A) as much as possible.

In some implementations, the base station 2A may communicate with the base station 2B through an inter-base-station interface (e.g., X2 interface of LTE) or through an upper-level network (e.g., core network) and configures respective prioritized radio resources assigned for the cells 21A and 21B.

In some implementations, the base station 2A may use a result of detecting neighboring radio terminals reported from at least one radio terminal 1 belonging to at least one of two D2D communication pairs 3 belonging to different cells (i.e., associated with different base stations) in order to determine whether the two D2D communication pairs are in proximity to each other. In such a case, the result of detecting neighboring radio terminals may include the above-described (a) an identifier of each of one or more neighboring radio terminals and (c) an identifier of a base station or a cell with which each of one or more neighboring radio terminals is associated. Further, the discovery signal may include an identifier of a neighboring radio terminal and an identifier of a base station (or a cell) with which the neighboring radio terminal is associated.

Figure 10:
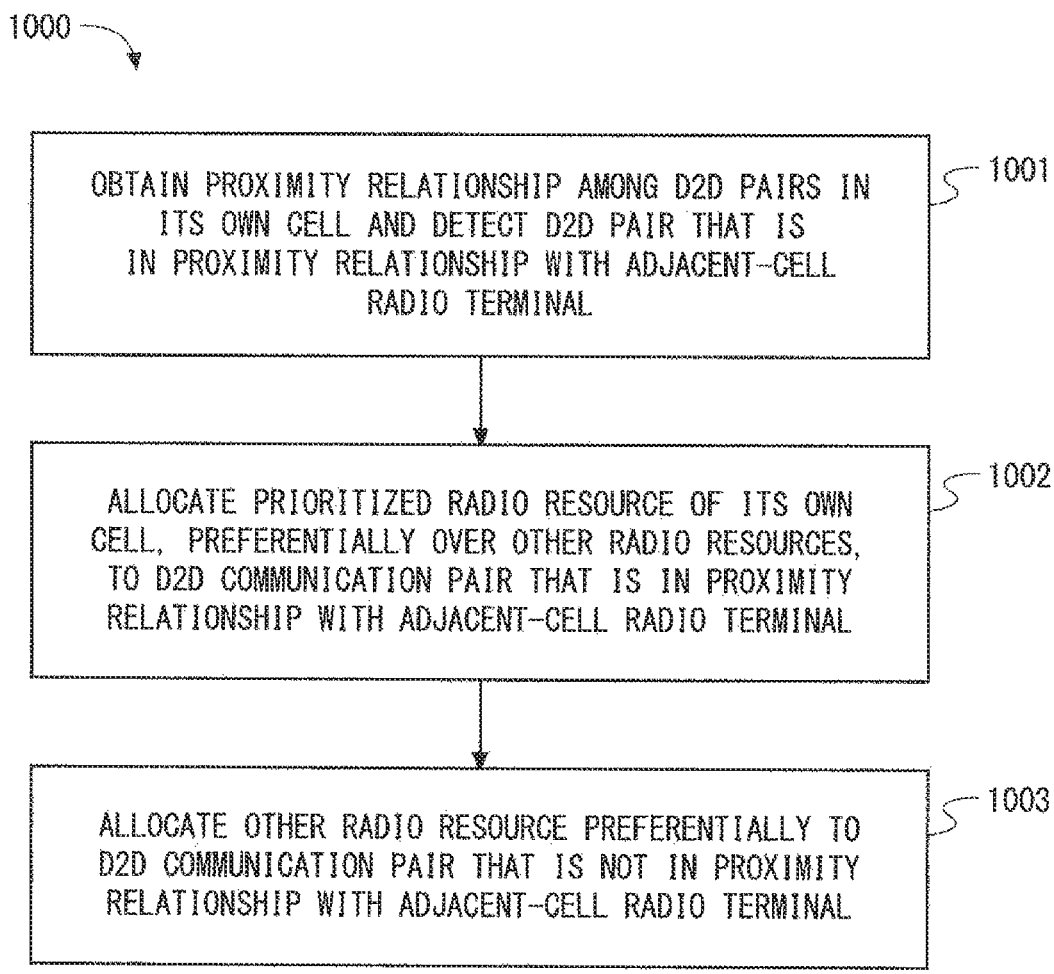
FIG. 10 is a flowchart showing an example of an operation performed by a base station according to the second embodiment.

FIG. 10 is a flowchart showing an example (a process 1000) of a scheduling method performed by the base station 2 according to this embodiment. In block 1001, the base station 2 obtains proximity relationships among a plurality of D2D pairs located in a cell managed by the base station 2 and detects a D2D pair(s) that is in a proximity relationship with an adjacent-cell radio terminal. As explained in the first embodiment, in an example, a proximity relationship between two D2D communication pairs may be evaluated based on whether the two transmitting terminal of the two pairs are in proximity to each other.

Alternatively, a proximity relationship between two D2D communication pairs may be evaluated based on whether the transmitting terminal of one of the pairs and the receiving terminal of the other pair are in proximity to each other.

In block 1002, the base station 2 allocates the prioritized radio resource of its own cell, preferentially over other radio resources, to a D2D communication pair (or transmitting terminal) that is in a proximity relationship with an adjacent-cell radio terminal. In block 1003, the base station 2 preferentially allocates a radio resource other than the prioritized radio resource of its own cell to a D2D communication pair that is not in a proximity relationship with any adjacent-cell radio terminal.

Figure 11:
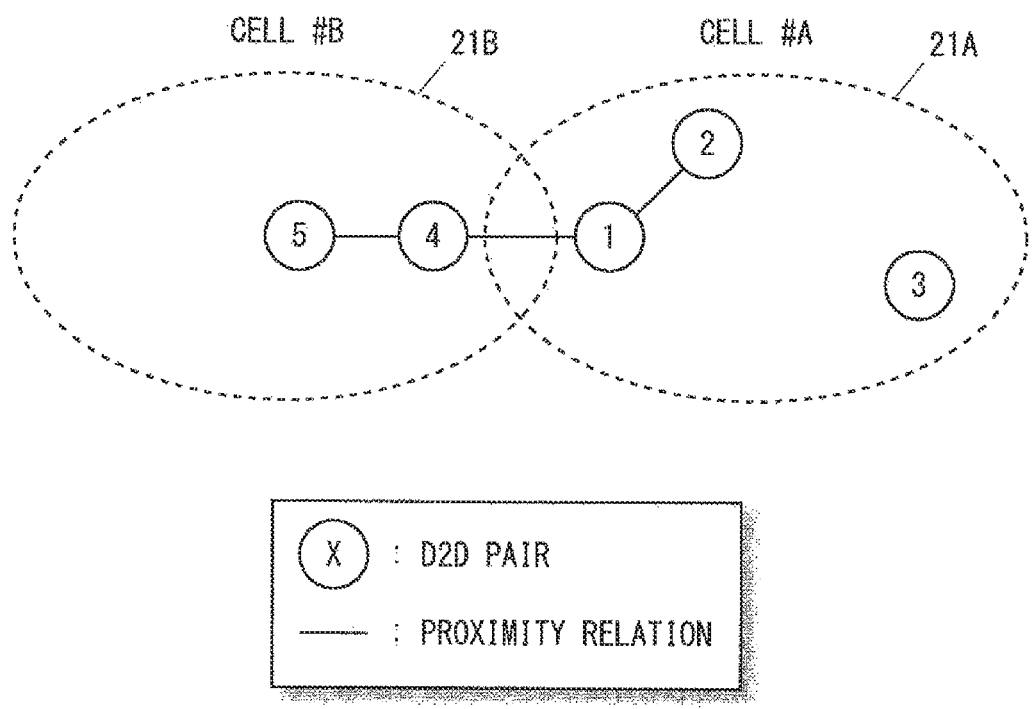
FIG. 11 shows a specific example of a proximity relationship among a plurality of D2D communication pairs.

A specific example of allocation of radio resources in this embodiment is described with reference to FIGS. 11 to 13. FIG. 11 is a schematic diagram showing a specific example of proximity relationships among D2D communication pairs 3 in cells 21A and 21B adjacent to each other. The example of FIG. 11 shows proximity relationships among five D2D communication pairs. Specifically, three D2D communication pairs #1 to #3 exist in the coverage of the cell 21A and two D2D communication pairs #4 and #5 exist in the coverage of the cell 21B. Directing attention to the cell 21A, D2D communication pair #1 has a proximity relationship with D2D communication pair #2 located in the cell 21A and a proximity relationship with D2D communication pair #4 located in the adjacent cell 21B. D2D communication pair #2 has a proximity relationship only with D2D communication pair #1. Meanwhile, D2D communication pair #3 does not have a proximity relationship with any of the other D2D communication pairs.

Figure 12:
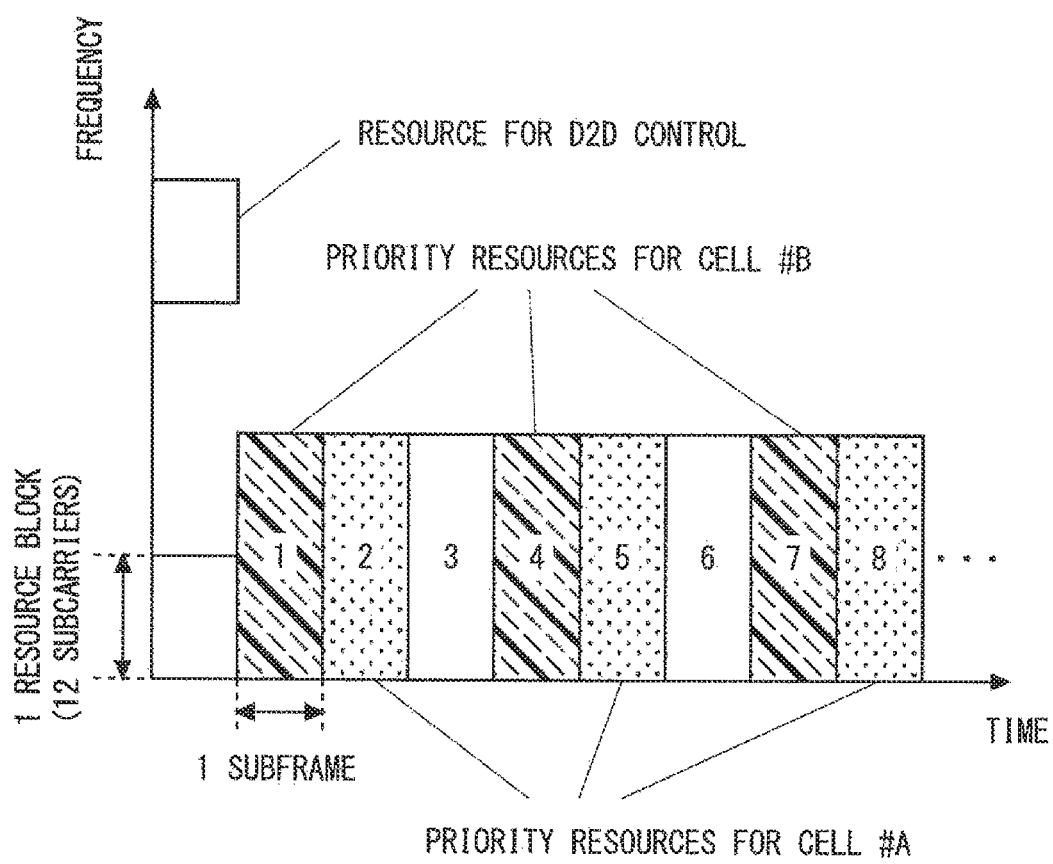
FIG. 12 shows a specific example of radio resources.

FIG. 12 shows a case in which a period of allocation of PSSCH resources (i.e., time resource pattern) for D2D data transmission is equal to 8 subframes as in the case shown in FIG. 4. Further, FIG. 12 shows an example of prioritized radio resources configuration in these 8 subframes. In the example shown in FIG. 12, three subframes #2, #5 and #8 are set to the prioritized radio resources of the cell 21A (the cell #A). Further, three subframes #1, #4 and #7 are set to the prioritized radio resources of the cell 21B (the cell #B). Meanwhile, the remaining two subframes #3 and #6 are non-prioritized radio resources that are set to neither the prioritized radio resources of the cell 21A nor the prioritized radio resources of cell 21B.

FIG. 13 shows an example in which D2D data transmission resources having an eight-subframe period shown in FIG. 12 are allocated to three D2D communication pairs #1 to #3 located in the cell 21 shown in FIG. 11 in accordance with a scheduling algorithm on which a constraint in regard to proximity relationships among D2D communication pairs and a constraint in regard to prioritized radio resources between adjacent cells are imposed. Note that in the example shown in FIG. 13, a round-robin algorithm to allocate radio resources to these three D2D communication pairs in the order of the pairs #1, #2 and #3 in a round robin fashion is used. A tick mark symbol in each cell in FIG. 13 indicates that the corresponding time domain resource (i.e., subframe) is allocated to the corresponding D2D communication pair. Further, numerical subscripts 1 to 16 of the tick mark symbols indicate an order in which radio resource allocation is determined.

In the example shown in FIG. 13, D2D communication pair #1, which has a proximity relationship with an adjacent-cell radio terminal, is assigned radio resources in accordance with the priority order of the prioritized radio resources of the cell 21A, the non-prioritized radio resources, and the prioritized radio resources of the adjacent cell 21B. Meanwhile, each of D2D communication pairs #2 and #3, both of which do not have a proximity relationship with any adjacent-cell radio terminal, is assigned radio resources in accordance with the priority order of the prioritized radio resources of the cell 21B, the non-prioritized radio resources, and the prioritized radio resource of the adjacent cell 21A.

Specifically, firstly, since D2D communication pair #1 has a proximity relationship with adjacent-cell D2D communication pair #4, among subframes #2, #5 and #8, which are set to the prioritized radio resources of the cell 21A, subframe #2 is allocated to D2D transmission performed by D2D communication pair #1. Next, since D2D communication pair #2 does not have a proximity relationship with adjacent-cell D2D communication pair #4, among subframes #1, #4 and #7, which are set to the prioritized radio resources of the cell 21B, subframe #1 is allocated to D2D transmission performed by D2D communication pair #2. Then, D2D communication pair #3 does not have a proximity relationship with adjacent-cell D2D communication pair #4 and also does not have a proximity relationship with D2D communication pairs #1 and #2 located in the cell 21A. Accordingly, subframe #1, which has already been allocated to D2D communication pair #2, is also allocated to D2D transmission performed by D2D communication pair #3.

After that, in the next second round, firstly, among subframes #5 and #8, which are the remaining prioritized radio resources of the cell 21A, subframe #5 is allocated to D2D transmission performed by D2D communication pair #1. Meanwhile, D2D communication pairs #2 and #3 are assigned the remaining non-prioritized radio resource, i.e., subframe #4. By repeating the allocation of radio resources as described above until the allocation can no longer be performed in this manner, an allocation result shown in FIG. 13 is eventually obtained. As understood from FIG. 13, D2D communication pair #1 having a proximity relationship with an adjacent-cell radio terminal can be assigned the prioritized radio resources (i.e., subframes #2, #5 and #8) of the cell 21, to which D2D communication pair #1 itself belong, and thereby use these prioritized radio resources of the cell 21 isolated from the resources used by the nearby D2D communication pair #2. Meanwhile, since D2D communication pair #3 does not have a proximity relationship with any of the D2D communication pairs located in the own cell 21A and the adjacent cell 21B, it is possible to allocate all subframes #1 to #8 by the effect of the spatial reuse.

Third Embodiment

This embodiment provides a modified example of the procedure for allocating radio resources to D2D transmissions explained in the first embodiment. A configuration example of a radio communication system according to this embodiment is similar to that shown in FIG. 1. In this embodiment, the base station 2 evaluates a proximity level between two D2D communication pairs in multiple levels no less than three levels. Further, the base station 2 determines whether to permit these two D2D communication pairs to perform D2D transmissions by sharing a time domain resource, depending on the proximity level.

Figure 14:
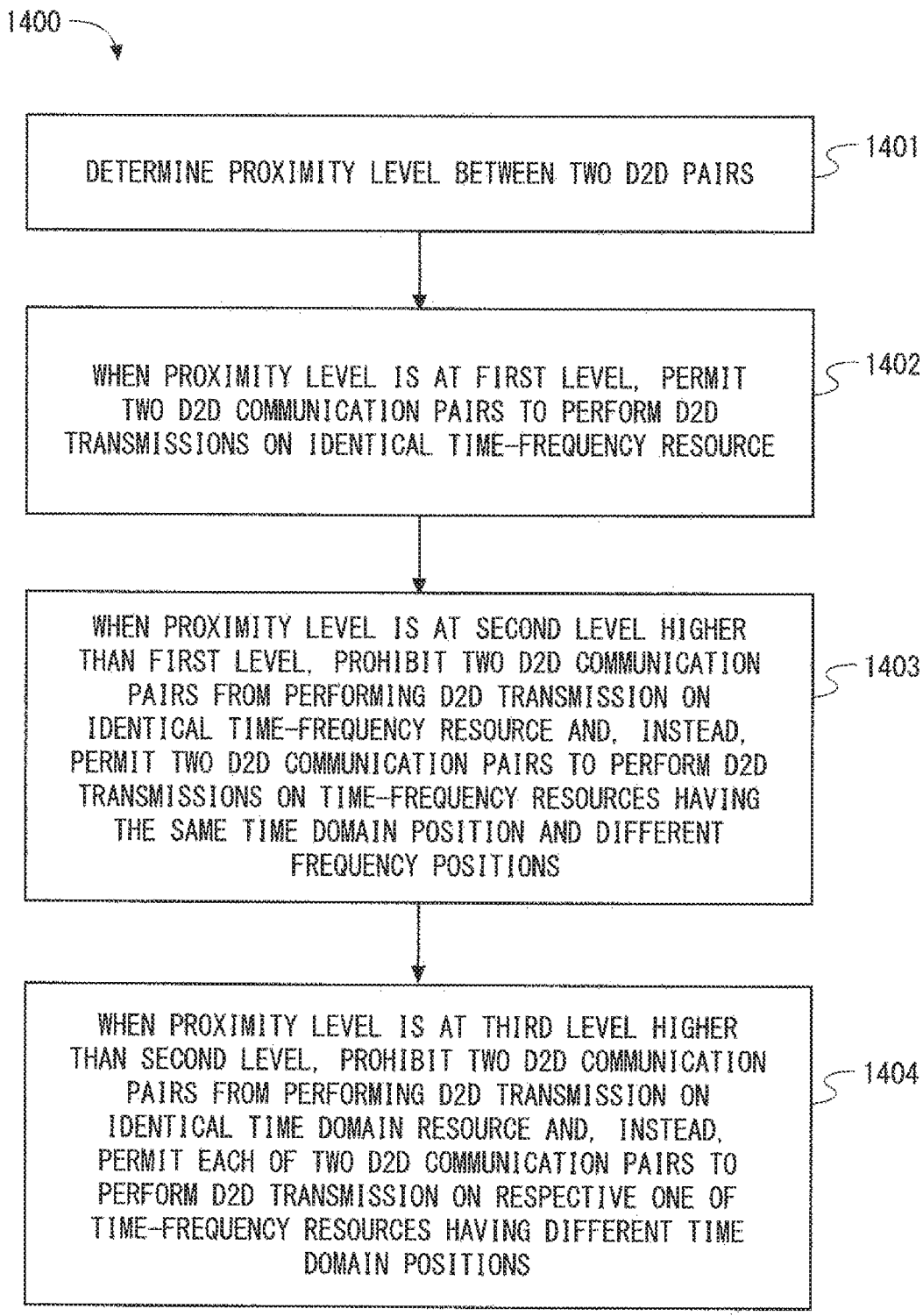
FIG. 14 is a flowchart showing an example of an operation performed by a base station according to a third embodiment.

FIG. 14 is a flowchart showing an example (a process 1400) of a scheduling method performed by the base station 2. In block 1401, the base station 2 determines a proximity level between two D2D communication pairs 3. In block 1402, when the proximity level is at a first level, which is a relatively low level, that is, when the geographic distance between the two D2D communication pairs 3 is relatively large, the base station 2 permits the two D2D communication pairs 3 to perform their respective D2D transmissions on an identical time-frequency resource.

In block 1403, when the proximity level is at a second level, which is an intermediate level, the base station 2 prohibits the two D2D communication pairs 3 from performing their respective D2D transmissions on an identical time-frequency resource and, instead, permits the two D2D communication pairs 3 to perform their respective D2D transmissions on a plurality of time-frequency resources that have the same time domain position and have different frequency domain positions.

In block 1404, when the proximity level is at a third level, which is a relatively high level, that is, when the geographic distance between the two D2D communication pairs 3 is relatively small, the base station 2 prohibits the two D2D communication pairs 3 from performing their respective D2D transmissions on an identical time domain resource and, instead, permits the two D2D communication pairs 3 to perform their respective D2D transmissions on a plurality of time-frequency resources having different time domain positions.

The processes in blocks 1402, 1403 and 1404 may be performed in an order different from the order shown in FIG. 14 or may be performed temporally in parallel with each other.

An example of the time-frequency resource is a resource block in LTE and LTE-Advanced. As already explained, in the case of the normal cyclic prefix, one resource block include 12 consecutive OFDM (or SC-FDMA) symbols in the time domain and 12 consecutive subcarriers in the frequency domain. Meanwhile, an example of the time domain resource is a subframe (1 ms) corresponding to the time length of two resource blocks or a slot (0.5 ms) corresponding to the time length of one resource block. A specific example of the frequency domain resource is a set of 12 sub carriers corresponding to one resource block.

As explained in the first embodiment, in some implementations, the base station 2 may determine a proximity level between two D2D communication pairs based on received signal power of a signal (e.g., discovery signal) transmitted from a neighboring radio terminal measured in the radio terminal 1. In such a case, the result of detecting neighboring radio terminals, which is reported from the radio terminal 1 to the base station 2, may include received signal power of a signal (e.g., discovery signal) transmitted from each of one or more neighboring radio terminals. Alternatively, the base station 2 may determine the proximity level between two D2D communication pairs based on a geographic distance between two radio terminals 1 derived from location information (e.g., GNSS location information) of the two radio terminals 1.

In general, it has been known that transmission performed by a radio terminal within the UL system bandwidth causes interference in the frequency domain to unallocated resource blocks (i.e., subcarriers) due to In-Band Emissions (IBE). Accordingly, when a plurality of D2D transmissions are simultaneously performed in close proximity of each other, interference resulting from the IBE could occur. As shown in block 1403 in FIG. 14, in this embodiment, when the proximity level between two D2D communication pairs 3 is at the third level, which is a relatively high level, the base station 2 prohibits the two D2D communication pairs 3 from performing D2D transmissions not only on an identical time-frequency resource (e.g., resource block) but also on an identical time domain resource (e.g., subframe). Therefore, it is possible to prevent the occurrence of interference resulting from the IBE which would otherwise occur when a plurality of D2D transmissions are simultaneously performed in close proximity of each other.

Figure 15:
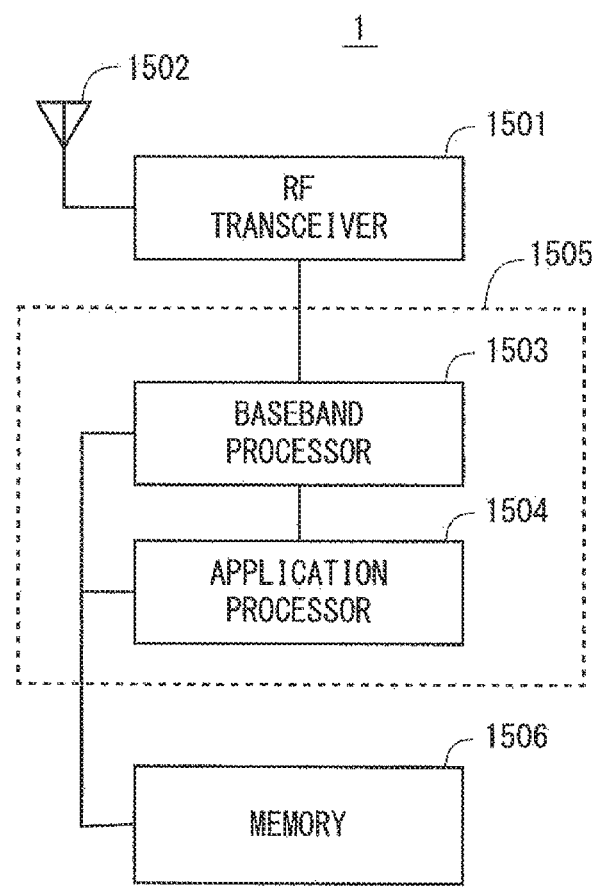
FIG. 15 is a block diagram showing a configuration example of a radio terminal according to some embodiments.

Lastly, configuration examples of the radio terminal 1 and the base station 2 according to the above-described embodiments will be described. FIG. 15 is a block diagram showing a configuration example of the radio terminal 1. A Radio Frequency (RF) transceiver 1501 performs an analog RF signal processing to communicate with the base station 2. The analog RF signal processing performed by the RF transceiver 1501 includes a frequency up-conversion, a frequency down-conversion, and amplification. The RF transceiver 1501 is coupled to an antenna 1502 and a baseband processor 1503. That is, the RF transceiver 1501 receives modulated symbol data (or OFDM symbol data) from the baseband processor 1503, generates a transmission RF signal, and supplies the generated transmission RF signal to the antenna 1502. Further, the RF transceiver 1501 generates a baseband reception signal based on a reception RF signal received by the antenna 1502 and supplies the generated baseband reception signal to the baseband processor 1503.

The baseband processor 1503 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 1503 may include signal processing of Packet Data Convergence Protocol (PDCP) layer, Radio Link Control (RLC) layer, MAC layer, and PHY layer. Further, the control-plane processing performed by the baseband processor 1503 may include processing of Non-Access Stratum (NAS) protocol, RRC protocol, and MAC CE.

The baseband processor 1503 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1504 described in the following.

The application processor 1504 may also be referred to as a CPU, an MPU, a microprocessor, or a processor core. The application processor 1504 may include a plurality of processors (processor cores). The application processor 1504 loads a system software program (Operating System (OS)) and various application programs (e.g., voice call application, WEB browser, mailer, camera operation application, and music player application) from a memory 1506 or from another memory (not shown) and executes these programs, thereby providing various functions of the radio terminal 1.

In some implementations, as represented by a dashed line (1505) in FIG. 15, the baseband processor 1503 and the application processor 1504 may be integrated on a single chip. In other words, the baseband processor 1503 and the application processor 1504 may be implemented in a single System on Chip (SoC) device 1505. A SoC device may be referred to as a system Large Scale Integration (LSI) or a chipset.

The memory 1506 is a volatile memory, a nonvolatile memory, or a combination thereof. The memory 1506 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1506 may include, for example, an external memory device that can be accessed by the baseband processor 1503, the application processor 1504, and the SoC 1505. The memory 1506 may include an internal memory device that is integrated in the baseband processor 1503, the application processor 1504, or the SoC 1505. Further, the memory 1506 may include a memory in a Universal Integrated Circuit Card (UICC).

The memory 1506 may store software module(s) (a computer program(s)) including instructions and data to perform processing by the radio terminal 1 described in the above described plurality of embodiments. In some implementations, the baseband processor 1503 or the application processor 1504 may be configured to load the software module(s) from the memory 1506 and execute the loaded software module(s), thereby performing the processing of the radio terminal 1 described in the above described embodiments.

Figure 16:
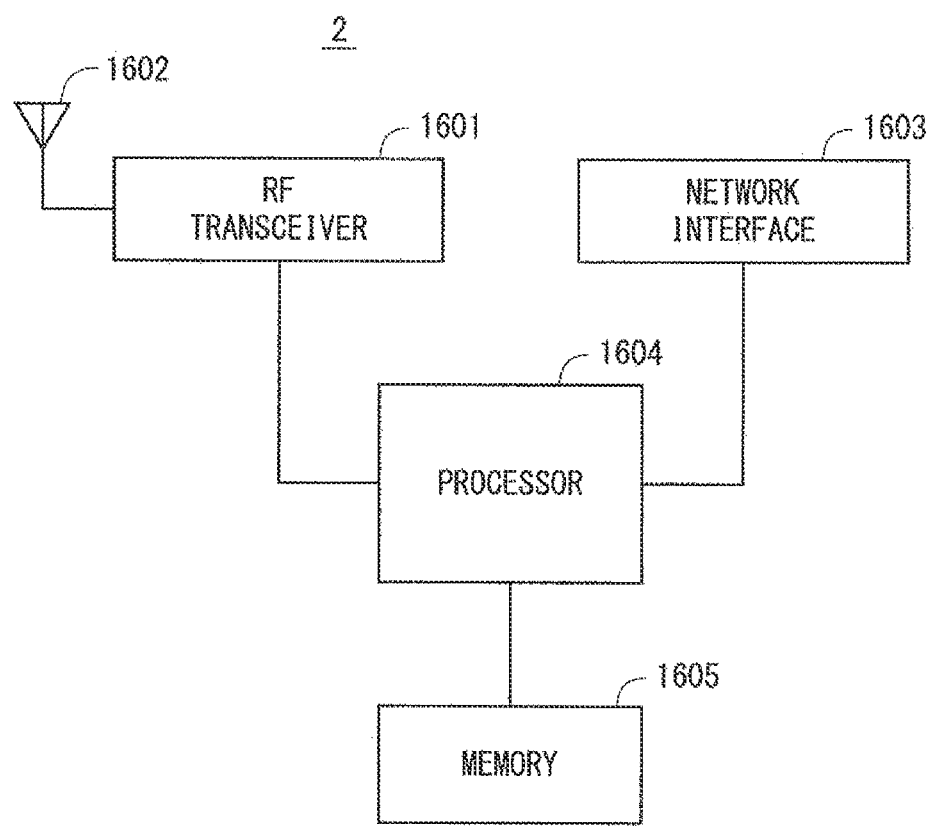
FIG. 16 is a block diagram showing a configuration example of a radio terminal according to some embodiments.

FIG. 16 is a block diagram showing a configuration example of the base station 2 according to the above-described embodiment. As shown in FIG. 16, the base station 2 includes an RF transceiver 1601, a network interface 1603, a processor 1604, and a memory 1605. The RF transceiver 1601 performs analog RF signal processing to communicate with the radio terminal 1. The RF transceiver 1601 may include a plurality of transceivers. The RF transceiver 1601 is connected to an antenna 1602 and the processor 1604. The RF transceiver 1601 receives modulated symbol data (or OFDM symbol data) from the processor 1604, generates a transmission RF signal, and supplies the generated transmission RF signal to the antenna 1602. Further, the RF transceiver 1601 generates a baseband reception signal based on a reception RF signal received by the antenna 1602 and supplies this signal to the processor 1604.

The network interface 1603 is used to communicate with a network node (e.g., Mobility Management Entity (MME) and Serving Gateway (S-GW)). The network interface 1603 may include, for example, a network interface card (NIC) conforming to the IEEE 802.3 series.

The processor 1604 performs digital baseband signal processing (i.e., data-plane processing) and control-plane processing for radio communication. For example, in the case of LTE or LTE-Advanced, the digital baseband signal processing performed by the processor 1604 may include signal processing of the PDCP layer, RLC layer, MAC layer, and PHY layer. Further, the control-plane processing performed by the processor 1604 may include processing of S1 protocol, RRC protocol, and MAC CE.

The processor 1604 may include a plurality of processors. For example, the processor 1604 may include a modem-processor (e.g., DSP) that performs the digital baseband signal processing, and a protocol-stack-processor (e.g., CPU or MPU) that performs the control-plane processing.

The memory 1605 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1605 may include a storage located apart from the processor 1604. In this case, the processor 1604 may access the memory 1605 through the network interface 1603 or an I/O interface (not shown).

The memory 1605 may store software module(s) (a computer program(s)) including instructions and data to perform processing by the base station 2 described in the above described plurality of embodiments. In some implementations, the processor 1604 may be configured to load the software module(s) from the memory 1605 and execute the loaded software module(s), thereby performing the processing of the base station 2 described in the above described embodiments.

As described above with reference to FIGS. 15 and 16, each of the processors included in the radio terminal 1 and the base station 2 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

In the above-described embodiments, the D2D communication pair 3 may be a D2D communication group consisting of two or more radio terminals. For example, D2D transmission in the D2D communication group may be performed in such a manner that a signal transmitted from one transmitting terminal is received by two or more receiving terminals (i.e., multicasting or broadcasting). Therefore, the term "D2D communication pair" used in the present disclosure can also be expressed as a "D2D communication group".

In the above-described embodiments, D2D communication according to the 3GPP LTE has been mainly explained. However, the technical concept explained in these embodiments may be applied to other D2D transmissions. For example, in the above-described embodiment, the D2D transmission according to the LTE may be replaced with D2D transmission using Wi-Fi Direct. In such a case, the radio terminal 1 has an inter-terminal communication function using Wi-Fi Direct, the radio resources corresponds to, for example, frequency channels of Wi-Fi, and the base station 2 corresponds to a control node that configures frequency channels used by Wi-Fi Direct terminals (i.e., radio terminals 1).

That is, the control node may be configured to allocate frequency channels to a plurality of device-to-device (D2D) transmissions performed by a plurality of D2D communication pairs included in a plurality of radio terminals, and also configured to allocate the frequency channels to the D2D transmissions in accordance with an allocation rule that permits two D2D communication pairs that are not in proximity to each other to share an identical frequency channel but prohibits two D2D communication pairs in proximity to each other from sharing an identical frequency channel. To enable the control node to perform the above-described frequency channel allocation, the control node may include at least one processor that executes one or more programs to perform allocation of frequency channels.

Further, the above-described embodiments are merely examples of applications of the technical ideas obtained by the inventor. Needless to say, these technical ideas are not limited to the above-described embodiments and various modifications can be made thereto.

REFERENCE SIGNS LIST

1 RADIO TERMINAL
2 BASE STATION
3 D2D COMMUNICATION PAIR
1501 RADIO FREQUENCY (RF) TRANSCEIVER
1503 BASEBAND PROCESSOR
1601 RF TRANSCEIVER
1604 PROCESSOR

The invention claimed is:

1. A base station comprising:
a radio transceiver configured to communicate with a plurality of radio terminals located in a first cell; and
at least one processor configured to schedule radio resources to a plurality of device-to-device (D2D) transmissions performed by a plurality of D2D communication pairs included in the plurality of radio terminals, each D2D transmission including wirelessly transmitting from one radio terminal directly to another radio terminal in each D2D communication pair without passing through the base station, wherein
the at least one processor is further configured to schedule radio resources to the plurality of D2D transmissions in accordance with an allocation rule that permits two D2D communication pairs that are not in proximity to each other to share an identical radio resource but prohibit two D2D communication pairs in proximity to each other from sharing an identical radio resource,
wherein the at least one processor is configured to:
allocate a first prioritized radio resource configured in the first cell, preferentially over another radio resource, to D2D transmission performed by a D2D communication pair in proximity to an adjacent-cell radio terminal that belongs to an adjacent cell of the first cell, and
allocate the other radio resource, preferentially over the first prioritized radio resource, to D2D transmission performed by a D2D communication pair that is not in proximity to the adjacent-cell radio terminal.

2. The base station according to claim 1, wherein the at least one processor is configured to allocate radio resources to the plurality of D2D transmissions in accordance with a proportional fairness algorithm on which the allocation rule is imposed.

3. The base station according to claim 1, wherein the at least one processor is configured to select a first D2D communication pair in a descending order of a scheduling metric on a first radio resource, and if the first radio resource has not been allocated to D2D transmission performed by a second D2D communication pair that has a larger scheduling metric than the first D2D communication pair and is in a proximity relationship with the first D2D communication pair, allocate the first radio resource to D2D transmission performed by the first D2D communication pair.

4. The base station according to claims 1, wherein the first prioritized radio resource is a radio resource of which a base station of the adjacent cell prohibits use by the adjacent-cell radio terminal.

5. The base station according to claim 1, wherein
the other radio resource includes a second prioritized radio resource configured in the adjacent cell and a non-prioritized radio resource that is set to neither the first prioritized radio resource nor the second prioritized radio resource, and
the at least one processor is configured to allocate the second prioritized radio resource, preferentially over the first prioritized radio resource and the non-prioritized radio resource, to D2D transmission performed by a D2D communication pair that is not in proximity to the adjacent-cell radio terminal.

6. The base station according to claim 1, wherein
the plurality of D2D communication pairs include third and fourth D2D communication pairs, and
the at least one processor is configured to:
permit the third and fourth D2D communication pairs to perform their respective D2D transmissions on an identical time-frequency resource when a proximity level indicating a geographic distance between the third and fourth D2D communication pairs is at a first level;
prohibit the third and fourth D2D communication pairs from performing their respective D2D transmissions on an identical time-frequency resource and, instead, permit the third and fourth D2D communication pairs to perform their respective D2D transmissions on a plurality of time-frequency resources that have the same time domain position and have different frequency domain positions, when the proximity level is at a second level higher than the first level; and
prohibit the third and fourth D2D communication pairs from performing their respective D2D transmissions on the same time domain resource and, instead, permit the third and fourth D2D communication pairs to perform their respective D2D transmissions on a plurality of time-frequency resources having different time domain positions, when the proximity level is at a third level higher than the second level.

7. The base station according to claim 1, wherein the at least one processor is configured to determine whether fifth and sixth D2D communication pairs included in the plurality of D2D communication pairs are in proximity to each other.

8. The base station according to claim 7, wherein the at least one processor is configured to determine whether the fifth and sixth D2D communication pairs are in proximity to each other based on at least one of: (a) a result of detection of a neighboring radio terminal reported from either radio terminal belonging to the fifth D2D communication pair; and (b) location information of at least one radio terminal belonging to the fifth D2D communication pair and location information of at least one radio terminal belonging to the sixth D2D communication pair.

9. The base station according to claim 8, wherein
the at least one processor is configured to receive the result of detection of a neighboring radio terminal, and the detection result includes at least one of: (a) an identifier of each of one or more neighboring radio terminals; and (b) an identifier of each of one or more D2D communication pairs to which the one or more neighboring radio terminals belong.

10. The base station according to claim 9, wherein the detection result further includes at least one of: (c) an identifier of a base station or a cell with which each of the one or more neighboring radio terminals is associated; (d) received signal power of a signal transmitted from each of the one or more neighboring radio terminals; and (e) the number of times of detection of the one or more neighboring radio terminals.

11. A scheduling method performed in a base station, the method comprising:
scheduling radio resources to a plurality of device-to-device (D2D) transmissions performed by a plurality of D2D communication pairs, in accordance with an allocation rule that permits two D2D communication pairs that are not in proximity to each other to share an identical radio resource but prohibits two D2D communication pairs in proximity to each other from sharing an identical radio resource, each D2D transmission including wirelessly transmitting from one radio terminal directly to another radio terminal in each D2D communication pair without passing through the base station,
wherein the scheduling comprises:
allocating a first prioritized radio resource configured in a first cell managed by the base station, preferentially over another radio resource, to D2D transmission performed by a D2D communication pair in proximity to an adjacent-cell radio terminal that belongs to an adjacent cell of the first cell, and
allocating the other radio resource, preferentially over the first prioritized radio resource, to D2D transmission performed by a D2D communication pair that is not in proximity to the adjacent-cell radio terminal.

12. The method according to claim 11, wherein the scheduling comprises allocating radio resources to the plurality of D2D transmissions in accordance with a proportional fairness algorithm on which the allocation rule is imposed.

13. The method according to claim 11, wherein the scheduling comprises:
selecting a first D2D communication pair in a descending order of a scheduling metric on a first radio resource; and
if the first radio resource has not been allocated to D2D transmission performed by a second D2D communication pair that has a larger scheduling metric than the first D2D communication pair and is in a proximity relationship with the first D2D communication pair, allocating the first radio resource to D2D transmission performed by the first D2D communication pair.

14. The method according to claim 11, wherein the first prioritized radio resource is a radio resource of which a base station of the adjacent cell prohibits use by the adjacent-cell radio terminal.

15. The method according to claim 11, wherein
the other radio resource includes a second prioritized radio resource configured in the adjacent cell and a non-prioritized radio resource that is set to neither the first prioritized radio resource nor the second prioritized radio resource, and
the scheduling comprises allocating the second prioritized radio resource, preferentially over the first prioritized radio resource and the non-prioritized radio resource, to D2D transmission performed by a D2D communication pair that is not in proximity to the adjacent-cell radio terminal.

16. The method according to claim 11, wherein
the plurality of D2D communication pairs include third and fourth D2D communication pairs, and
the scheduling comprises:
permitting the third and fourth D2D communication pairs to perform their respective D2D transmissions on an identical time-frequency resource when a proximity level indicating a geographic distance between the third and fourth D2D communication pairs is at a first level;
prohibiting the third and fourth D2D communication pairs from performing their respective D2D transmissions on an identical time-frequency resource and, instead, permitting the third and fourth D2D communication pairs to perform their respective D2D transmissions on a plurality of time-frequency resources that have the same time domain position and have different frequency domain positions, when the proximity level is at a second level higher than the first level; and
prohibiting the third and fourth D2D communication pairs from performing their respective D2D transmissions on the same time domain resource and, instead, permitting the third and fourth D2D communication pairs to perform their respective D2D transmissions on a plurality of time-frequency resources having different time domain positions, when the proximity level is at a third level higher than the second level.

17. A non-transitory computer readable medium storing a program for causing a computer to perform a scheduling method in a base station, wherein the scheduling method comprises:
scheduling radio resources to a plurality of device-to-device (D2D) transmissions performed by a plurality of D2D communication pairs, in accordance with an allocation rule that permits two D2D communication pairs that are not in proximity to each other to share an identical radio resource but prohibits two D2D communication pairs in proximity to each other from sharing an identical radio resource, each D2D transmission including wirelessly transmitting from one radio terminal directly to another radio terminal in each D2D communication pair without passing through the base station,
wherein the scheduling comprises:
allocating a first prioritized radio resource configured in a first cell managed by the base station, preferentially over another radio resource, to D2D transmission performed by a D2D communication pair in proximity to an adjacent-cell radio terminal that belongs to an adjacent cell of the first cell, and
allocating the other radio resource, preferentially over the first prioritized radio resource, to D2D transmission performed by a D2D communication pair that is not in proximity to the adjacent-cell radio terminal.

18. The non-transitory computer readable medium according to claim 17, wherein the scheduling comprises allocating radio resources to the plurality of D2D transmissions in accordance with a proportional fairness algorithm on which the allocation rule is imposed.

19. The non-transitory computer readable medium according to claim 17, wherein the first prioritized radio resource is a radio resource of which a base station of the adjacent cell prohibits use by the adjacent-cell radio terminal.

20. The non-transitory computer readable medium according to claim 17, wherein
- the other radio resource includes a second prioritized radio resource configured in the adjacent cell and a non-prioritized radio resource that is set to neither the first prioritized radio resource nor the second prioritized radio resource, and
- the scheduling comprises allocating the second prioritized radio resource, preferentially over the first prioritized radio resource and the non-prioritized radio resource, to D2D transmission performed by a D2D communication pair that is not in proximity to the adjacent-cell radio terminal.

* * * * *